US011717881B2

(12) United States Patent
Müller et al.

(10) Patent No.: US 11,717,881 B2
(45) Date of Patent: Aug. 8, 2023

(54) 3D PRINTER AND GENERATIVE MANUFACTURING PROCESS

(71) Applicant: ExOne GmbH, Gersthofen (DE)

(72) Inventors: Alexander Müller, Diedorf-Vogelsang (DE); Martin Bednarz, Tandern (DE)

(73) Assignee: EXONE GMBH, Gersthofen (DE)

( * ) Notice: Subject to any disclaimer, the term of this patent is extended or adjusted under 35 U.S.C. 154(b) by 0 days.

(21) Appl. No.: 15/733,478

(22) PCT Filed: Jun. 28, 2018

(86) PCT No.: PCT/EP2018/067367
§ 371 (c)(1),
(2) Date: Aug. 6, 2020

(87) PCT Pub. No.: WO2019/154528
PCT Pub. Date: Aug. 15, 2019

(65) Prior Publication Data
US 2021/0101335 A1    Apr. 8, 2021

(30) Foreign Application Priority Data

Feb. 7, 2018  (DE) ...................... 10 2018 102 753.2

(51) Int. Cl.
*B33Y 30/00* (2015.01)
*B29C 64/182* (2017.01)
(Continued)

(52) U.S. Cl.
CPC .................. *B22C 9/02* (2013.01); *B22C 9/10* (2013.01); *B22F 10/14* (2021.01); *B22F 10/30* (2021.01);
(Continued)

(58) Field of Classification Search
CPC ... B29C 64/165; B29C 64/182; B29C 64/209; B29C 64/227; B29C 64/245; B22F 12/224; B22F 12/67; B22F 10/14
See application file for complete search history.

(56) References Cited

U.S. PATENT DOCUMENTS 8,741,194 B1 * 6/2014 Ederer .................. B33Y 10/00
264/236
10,093,065 B2 * 10/2018 Ederer .................. B29C 64/165
(Continued)

FOREIGN PATENT DOCUMENTS

DE    102009051552 A1    5/2011
DE    102009056696 A1    6/2011
(Continued)

OTHER PUBLICATIONS

International Search Report issued for the corresponding international patent application No. PCT/EP2018/067367, dated Nov. 7, 2018, 1 page (for informational purposes only).
(Continued)

*Primary Examiner* — Seyed Masoud Malekzadeh
(74) *Attorney, Agent, or Firm* — Viering, Jentschura & Partner MbB

(57) ABSTRACT

Described is a 3D printer, which is configured to build up at least one three-dimensional component in layers in a construction space by forming construction material layers lying one upon the other, of particulate construction material, and selectively solidifying several adjoining construction material layers in a respective partial region thereof. The 3D printer comprises a coating device 3 which is movable in a first direction $H_1$ across the construction space B1 to supply construction material to the construction space B1 in the form of a uniform construction material layer of the construction material to be solidified, a printing device 5 which is movable in a second direction $H_2$ across the construction
(Continued)

space B1, in order to output in a controlled manner a flowable treatment agent to a partial region of a previously applied construction material layer, which treatment agent contributes to a selective solidification thereof, and a control device C, which is configured to control the coating device 3 and the printing device 5 in such a way that they travel across the construction space B1 in a way to overlap in time and/or that they, in an overlapping manner, supply construction material to the construction space B1 and dispense flowable treatment agent in a controlled manner to a partial region of a previously applied construction material layer, respectively.

4 Claims, 3 Drawing Sheets

(51) Int. Cl.

| | | |
|---|---|---|
| *B29C 64/209* | (2017.01) | |
| *B29C 64/165* | (2017.01) | |
| *B22F 12/00* | (2021.01) | |
| *B22F 12/67* | (2021.01) | |
| *B22F 12/90* | (2021.01) | |
| *B29C 64/227* | (2017.01) | |
| *B29C 64/245* | (2017.01) | |
| *B22C 9/02* | (2006.01) | |
| *B33Y 10/00* | (2015.01) | |
| *B33Y 80/00* | (2015.01) | |
| *B22C 9/10* | (2006.01) | |
| *B22F 10/14* | (2021.01) | |
| *B22F 10/30* | (2021.01) | |

(52) U.S. Cl.
CPC ............ *B22F 12/224* (2021.01); *B22F 12/67* (2021.01); *B22F 12/90* (2021.01); *B29C 64/165* (2017.08); *B29C 64/182* (2017.08); *B29C 64/209* (2017.08); *B33Y 10/00* (2014.12); *B33Y 30/00* (2014.12); *B33Y 80/00* (2014.12); *B29C 64/227* (2017.08); *B29C 64/245* (2017.08)

(56) References Cited

U.S. PATENT DOCUMENTS

| | | | |
|---|---|---|---|
| 10,286,571 B2 * | 5/2019 | Höchsmann | ............ B33Y 10/00 |
| 10,414,093 B2 * | 9/2019 | Ikeyama | ................ B33Y 30/00 |
| 2012/0219726 A1 | 8/2012 | Bayer et al. | |
| 2013/0004607 A1 | 1/2013 | Hoechsmann et al. | |
| 2016/0318251 A1 * | 11/2016 | Ederer | ................. B29C 64/165 |
| 2017/0021564 A1 | 1/2017 | Ooba et al. | |
| 2017/0341303 A1 | 11/2017 | Hochsmann et al. | |
| 2017/0361500 A1 | 12/2017 | Hochsmann et al. | |
| 2017/0368748 A1 | 12/2017 | De Pena et al. | |
| 2018/0043616 A1 * | 2/2018 | Ikeyama | ................ B29C 64/153 |
| 2018/0169894 A1 | 6/2018 | Höchsmann et al. | |
| 2019/0084229 A1 * | 3/2019 | Günther | ................ B29C 64/209 |

FOREIGN PATENT DOCUMENTS

| | | | |
|---|---|---|---|
| DE | 102012107297 A1 | 6/2014 | |
| DE | 102013021891 A1 * | 6/2015 | ............ B28B 1/001 |
| DE | 102014112447 A1 * | 3/2016 | ............ B22F 10/28 |
| DE | 102014112454 A1 | 3/2016 | |
| DE | 102014112469 A1 | 3/2016 | |
| JP | 2017532218 A | 11/2017 | |
| WO | 2015151832 A1 | 10/2015 | |
| WO | WO-2015151832 A1 * | 10/2015 | ............ B28B 1/001 |
| WO | 2016030375 A2 | 3/2016 | |
| WO | 2016030405 A1 | 3/2016 | |

OTHER PUBLICATIONS

International Preliminary Examination Report issued for the corresponding international patent application No. PCT/EP2018/067367, dated Jan. 7, 2020, 6 pages (for informational purposes only).

Notice of Reasons for Refusal issued for the corresponding Japanese patent application No. 2020-542370, dated Jan. 12, 2021, 5 pages (for informational purposes only).

* cited by examiner

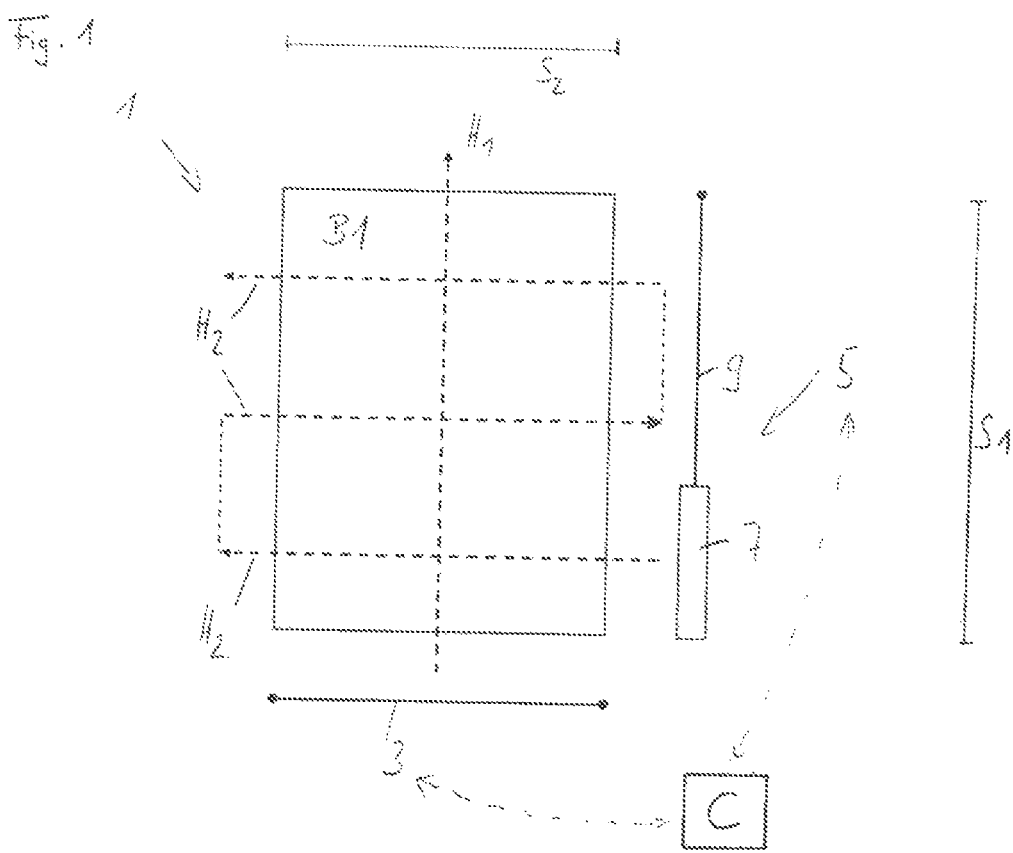
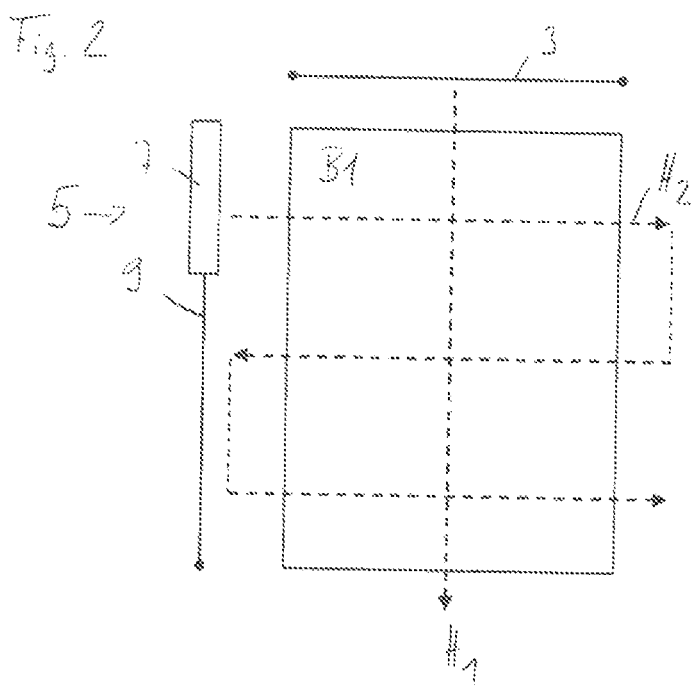

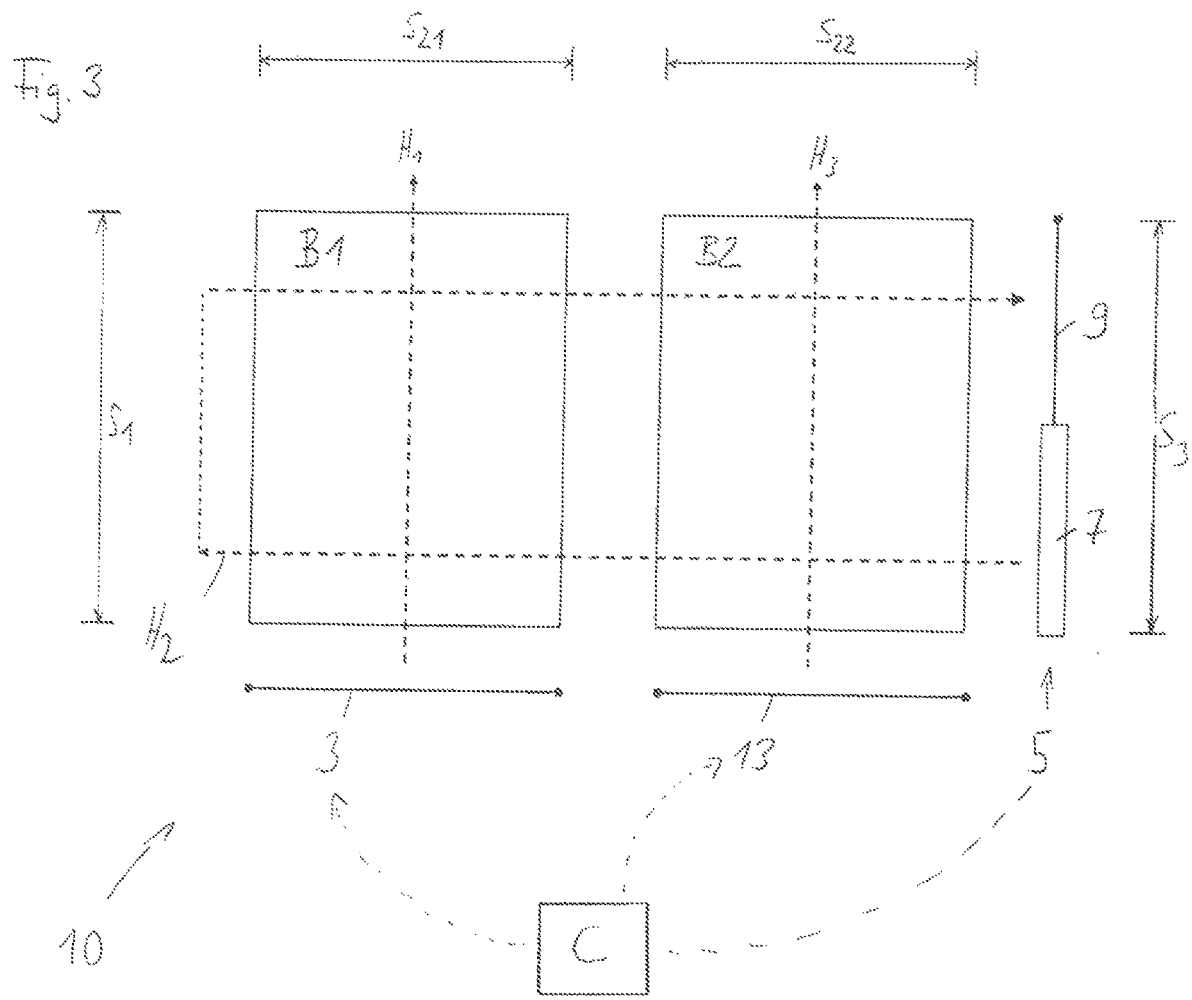

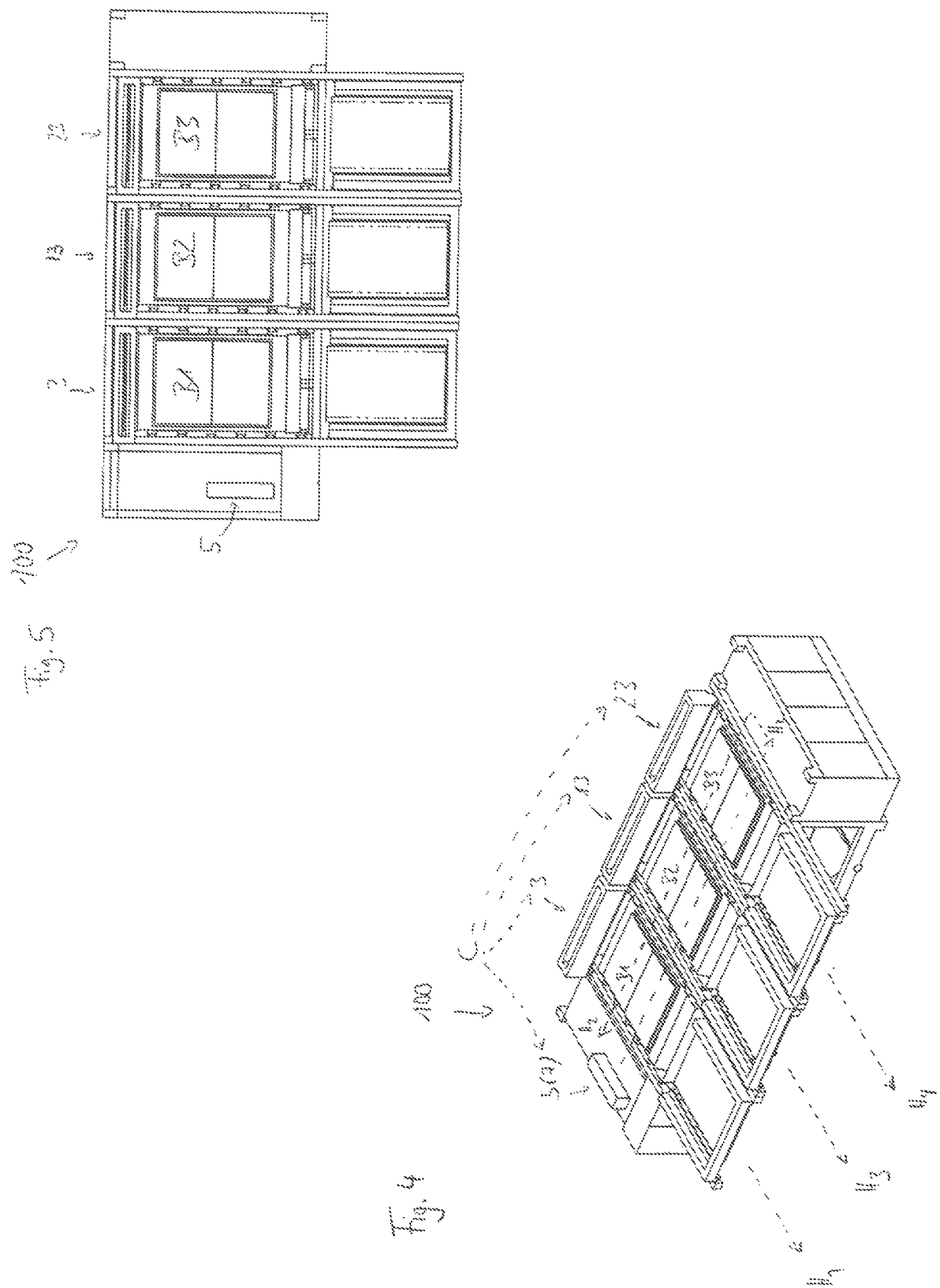

3D PRINTER AND GENERATIVE MANUFACTURING PROCESS

The present invention relates to a 3D printer according to the preamble of claim 1 or claim 7 as well as to a generative manufacturing process according to the preamble of claim 5 or claim 13.

Various generative manufacturing processes (and consequently various types of 3D printers) are known.

Some generative manufacturing processes have the following steps in common:

(1) First, particulate material is applied over the entire surface of a construction field, so as to form a layer of unsolidified particulate material.

(2) The applied layer of unsolidified particulate material is selectively solidified in a predetermined partial region, for example by selectively printing a treatment agent, for example a binder.

(3) Steps (1) and (2) are repeated to manufacture a desired component. For this purpose, a construction platform on which the component is built up in layers may, for example, be lowered by respectively one layer thickness before a new layer is applied over the entire surface (alternatively, the coating device and the printing device may, for example, be raised by respectively one layer thickness).

(4) Finally, the manufactured component which is supported and surrounded by loose, unsolidified particulate material may be unpacked.

The construction space in which the component or the components is/are manufactured may, for example, be defined by a so-called construction box (also referred to as "job box"). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may for example at least contribute to forming the construction space. An upper area of the construction space may, for example, be referred to as construction field. An example of such a construction box is, for example, described in DE 10 2009 056 696 A1.

A coating device arrangement having a coating device (also referred to as a "recoater") is normally used in the above step (1). Various coating device arrangements are known for use in 3D printers, by means of which a particulate construction material may be applied to the construction field (also referred to as construction surface or construction area) in the form of a uniform layer over the entire surface.

One type of coating device arrangement uses a roller (short: "roller coating device") in front of which first an amount of particulate construction material is put down and which is then (for example horizontally) moved across the construction field to apply the particulate construction material in the form of a uniform layer onto the construction field. In this respect, the roller may be rotated opposite to the moving direction. Coating device arrangements of this type are in particular suitable for small construction fields and for a short distance to be spanned by the coating device.

Another kind of coating device arrangement (a so-called coating device arrangement having a "container coating device", for example a "slot coating device") uses a coating device with a container which is displaceable (for example horizontally) across a construction field and defines an inner cavity for receiving particulate construction material which leads to an opening for outputting the particulate construction material onto the construction field. The coating device may be elongate, for example to span or to cover the length or width of a rectangular construction field. The opening may then be provided as a longitudinal slot. The coating device can thus be moved (for example horizontally) across the construction field and at the same time output particulate construction material from the opening onto the construction field to thereby apply a uniform layer over the entire surface of the construction field. An example of a coating device of this type is, for example, described in DE 10 2014 112 454 A1.

In the above step (2), a printing device having a print head may for example be used, which applies a treatment agent in a controlled way onto a subarea of the construction material layer applied before. The treatment agent contributes to a solidification of the construction material layer in the subarea. For example, the treatment agent may be a binder, for example a binder component of a multicomponent binder.

Particulate construction material within the meaning of this application may be understood as a construction material comprising at least one kind of particulate material (for example (grains of) sand, for example foundry sand, and/or metal particles and/or particles of synthetic material). Several different types of particulate material may be included in the construction material as well, such as a mixture of new sand and recycled sand or a mixture of fine sand and coarse sand or a mixture of two different types of sand. Moreover, the construction material may comprise at least one liquid component, for example a binder component, for example an activator, and/or one or more solid and/or liquid additives. In case that the construction material contains a binder component, another binder component, such as furan resin, may selectively be printed onto a previously applied construction material layer by means of a printing device, so as to solidify this layer in a predetermined area. Depending on the component to be manufactured, for example a casting mold or a foundry core, a construction material composition specifically prepared for this purpose may be used. In this respect, the construction material composition may be defined by the number of components used as well as by the respective type and the respective share of components contained in the construction material (mixture).

A 3D printer according to the preamble of claim 1 or claim 7 is for example known from WO 2016/030405 A1. See there for example FIG. 1. The 3D printer shown there can receive two construction boxes at the same time and can thus execute two construction jobs (=generative manufacturing of one or more components in an assigned construction space) in parallel. The two construction spaces are formed to be rectangular and are arranged adjacent to each other along a respective short side. Each construction box or construction space has an assigned coating device running perpendicular to the long sides of the rectangle, and a common printing device running perpendicular to the short sides of the rectangle serves both the first and second construction spaces. According to WO 2016/030405 A1, the construction job(s) can be carried out quickly due to said arrangement of coating devices and common printing device. See there the paragraph extending over pages 5 and 6 and page 13, last paragraph.

The present invention provides a 3D printer according to claim 1, a 3D printer according to claim 7, a generative manufacturing process according to claim 5, and a generative manufacturing process according to claim 13. Further inventive embodiments are described in the respective dependent claims.

According to various exemplary embodiments of the invention, a 3D printer and a generative manufacturing process can be provided, by means of which components of appropriate quality can be produced with reasonable effort in an appropriate time.

According to various exemplary embodiments of the invention, components of appropriate quality can be produced easily, reliably and quickly.

According to an aspect of the present invention, a 3D printer is configured to build up a three-dimensional component, for example a casting mold or a foundry core, in layers in a construction space, by forming construction material layers of particulate construction material, for example containing sand particles, lying one upon the other and by selectively solidifying several construction material layers adjoining each other (in a thickness direction) in a respective partial region thereof (according to a respective section plane through the component to be manufactured). For example, the construction space may be at least co-formed/co-developed by a construction platform or may be arranged above it, i.e. the 3D printer may comprise a construction platform on which the component(s) is/are built. In addition, the construction space may be formed/defined by a construction box as described above, i.e. the 3D printer may comprise, for example, a construction box as described above. The 3D printer comprises a coating device which is movable in a first direction (e.g. first horizontal direction) across the construction space in order to supply the construction space with construction material in the form of a uniform construction material layer of the construction material to be solidified, and a printing device which is movable in a second direction (e.g. second horizontal direction) across the construction space in order to output a flowable treatment agent to a partial region of a previously applied construction material layer in a controlled manner, which contributes to a selective solidification thereof. For example, the coating device may be configured as a so-called "container coating device" (see above; coating device with a container which can be moved (e.g. horizontally) across the construction space and defines an inner cavity for receiving particulate construction material, which opens out in an opening for outputting the particulate construction material onto the construction field or construction space), for example as a so-called "slot coating device", the opening of which is configured as an elongated slot. The 3D printer further comprises a control device which is configured to control the coating device and the printing device in such a way that they move across the construction space in a way overlapping in time and/or that they, in overlapping fashion, supply the construction space with construction material or output flowable treatment agent in a controlled way onto a partial region of a previously applied construction material layer.

By way of illustration, according to the present invention, in a 3D printer of the type described in the preamble of claim 1, the time required for a construction job may be reduced by overlapping the movement of the printing device across the construction space with the movement of the coating device across the construction space and/or by overlapping the supply of construction material to the construction space with the output of flowable treatment agent to a previously applied layer. In other words, according to the present invention, the performance and output of the 3D printer may be increased by providing a control device which is configured to partially, for example as far as possible, parallelize a printing operation performed by the printing device and a coating operation performed by the coating device. Thus, according to the present invention, the printing process and the coating process overlap each other, unlike in the state of the art where always either printing or coating is performed, i.e. the coating process and the printing process are separated in time and follow each other in the state of the art. The extent to which a printing process is parallelized with a coating process or the extent of the overlap, and how many of the printing and coating processes are in the end parallelized with each other depends, among other things, on the respective application.

In other words, according to the invention, printing and coating is carried out in the construction space sectionwise/temporarily at the same time/in parallel. For example, the coating device may start to apply a layer, and after the coating device has travelled far enough or the layer has been applied sufficiently far in the first direction, a first section of the layer (so-called print section, for example a "first cross-strip") can be printed "in the back of the coating device" or behind it, so that there is no need to wait for the completion of the complete layer. For this purpose, the printing device may, for example, have a print head segmented in the first direction, the segments of which (for example, one segment per print section or print strip) are movable separately in the second direction across the construction space, or a print head displaceable in the first direction (see below); in general, the printing device may therefore be configured to selectively print on the construction space or a previously applied layer in several print sections which, as viewed in the first direction, are arranged one after the other and are processed in succession, a respective print section being passed along the second direction by the printing device. Alternatively, however, the coating device may also operate in the back of the printing device, i.e. the printing device may start printing a layer which has already been applied completely, and after, for example, a first section of the layer (corresponding to a first print section) or a sufficiently large area has been completely processed by the printing device, the coating device may start applying a new layer, i.e. coat the "freshly" printed first print section.

For example, the control device may control the coating device and the printing device in such a way that there is a degree of overlap greater than or equal to 20%, for example greater than or equal to 25%, for example greater than or equal to 30%, for example greater than or equal to 35%, for example greater than or equal to 40%, for example greater than or equal to 45%, for example greater than or equal to 50%, for example greater than or equal to 55%, for example greater than or equal to 60%. For example, the degree of overlap may be calculated as follows: $t_{B,D}/t_B * 100$, where $t_B$ is the time it takes to coat or apply a layer (i.e. the time it takes the coating device to move across the construction space), and where $t_{B,D}$ is the time it takes to both print and coat or during which the coating device and the printing device move across the construction space with an overlap in time (for example including possible turning sections between individual runs of the printing device across the construction space, but excluding possible waiting periods/stop periods of the printing device during which the printing device stands still/rests between two individual runs to allow the coating device to advance). If, for example, the printing device (continuously) operates in the back of the coating device, the degree of overlap may be calculated, for example, from the quotient of the remaining coating time from the start of printing (printing device reaches construction space to pass over it in the second direction) divided by the total coating time (for one layer). If, for example, the coating device operates in the back of the printing device, the degree of overlap may be calculated, for example, from the quotient of the remaining printing time from the start of coating (coating device reaches construction space in order to pass over it in the first direction) divided by the total coating time (for one layer).

According to one embodiment, in the 3D printer, the printing device may comprise a print head that is displaceable in the first direction, wherein the control device moves the print head to selectively print a construction material layer (or to selectively solidify a construction material layer or to print the respective partial region of a layer) several times (in an offset manner) in the second direction across the construction space, for example in such a way that the print head is moved across the construction space in a generally meandering pattern (in the case of a bidirectional print head), for example along a U-shaped path (composed of two individual runs) or an S-shaped path (three individual runs). For this purpose, the printing device may, for example, comprise a print head carrier which extends in the first direction and to which the print head is movably attached, wherein the print head carrier may in turn be attached to a linear guide, for example at its two end sides, along which the print head carrier is movable in the second direction across the construction space. In this respect, by moving the print head in the first direction, several print sections, for example several print strips, may be formed, which may, for example, be arranged parallel to each other and one after the other as seen in the first direction. In this respect, the control device may, for example, be configured to overlap the print sections at edge sections as seen in the first direction.

By way of illustration, according to this embodiment, an overlap potential may be effectively used. For example, the printing of a first printing strip/print section may, by way of illustration, be started as soon as the coating device has been moved sufficiently far in the first direction, i.e. beyond the extension of the first print strip/print section in the first direction, or conversely the coating device may be moved across the construction space after the first print strip/print section has been printed and before the printing device has completely travelled the construction space (or the remaining print section(s)).

Alternatively or in addition, according to an embodiment of the 3D printer, a distance to be travelled by the coating device across the construction space along the first direction may be greater than or equal to a distance travelled by the printing device when moving once across the construction space along the second direction. A single travel of the coating device in the first direction across the construction space is therefore greater than or equal to a single travel of the printing device in the second direction across the construction space. In other words, the dimension of the construction space in the first direction may be greater than or equal to the dimension of the construction space in the second direction. Thus, the construction space may be square or rectangular with two long and two short sides in the top view. In the latter case, the coating device route may correspond to a long side and the (single) printing device route may correspond to a short side.

By way of illustration, according to this embodiment, an overlap potential may be used in a particular effective way, for example in combination with the embodiment described above. In other words, this favors a division of the print area into print sections which, when viewed in the first direction, are located one after another.

If the arrangement of coating device and printing device is selected in such a way that the distance to be travelled by the coating device across the construction field is greater than or equal to the distance to be travelled by the printing device across the construction field, i.e. inverse to the arrangement described in WO 2016/030405 A1, or a distance or extension of the first construction space which is traversed by the coating device (along the first direction) is greater than or equal to a distance or extension of the construction space which is traversed by the printing device (along the second direction), it may thereby be possible according to various embodiments, that an appropriate quality of the components to be produced is guaranteed, for example at reasonable cost and/or reasonable complexity, since the coating device runs over the longer distance (at least not the shorter one) and can therefore itself span the shorter distance (at least not the longer one). It should be taken into account in this regard that the respective length/distance that a coating device can span without affecting the component quality (for example as a result of a deflection of the coating device or a coating device component, such as a coating device blade for stroking output construction material) is limited in practice (especially at reasonable cost and/or with reasonable complexity). The use of several coating devices for one and the same construction space, on the other hand, may be problematic, since the application of an even layer (especially between the two coating devices) may then no longer be possible or at least be very difficult.

Moreover, the inventors of the present invention have surprisingly realized that moving the coating device over the longer distance (at least not over the shorter one) does not necessarily have to lead to longer overall production times, but that the comparatively long distance and running time of the coating device can be used to superimpose or "parallelize" the process of printing and the process of coating in an effective way.

As stated above, a print head of the printing device may, for example, be segmented along the first/long direction or may cover only a part of the construction field along the first/long direction, but may be configured to be displaceable in the first direction, the print head or a segment thereof being moved across the construction field in the second direction (along a first print section) even before the coating device has made its full path across the construction field and after the coating device has travelled a sufficient distance in the first direction. In other words, the inventors have recognized that there is a particularly large potential for overlap between the two processes of printing and coating with said arrangement. The inventors have thus overcome a prejudice in this respect (moving the coating device along a short direction), wherein even shorter production times can be achieved with said arrangement under comparable conditions than with the inverse arrangement, if the overlap potential is used in a particular effective way.

Alternatively or in addition, according to an embodiment, in the 3D printer, the coating device may be configured as a bidirectional coating device and/or the printing device may be configured as a bidirectional printing device. This means that the coating device may be configured to output construction material in the form of a uniform layer during a journey and a return journey across the construction space (in the first direction in each case). For this purpose, the coating device may, for example, be configured as a container coating device, which has a stroking member (for example a coating device blade) on both sides of the opening (in the first direction), whose respective angle of attack/angle of inclination is adjustable, for example. For example, the stroking member may have a downwardly directed stroking surface adapted to stroke construction material output from the opening, to thereby level and/or compress the output particulate material. A suitable coating device is described, for example, in DE 10 2014 112 469 A1, the content of which is incorporated herein by reference.

By way of illustration, the time required for a construction job can be further reduced and the performance and the output of the 3D printer can be further increased according to this embodiment.

Alternatively or in addition, according to an embodiment of the 3D printer, an output region of the coating device (for example the opening and/or slot of the coating device) may completely span the construction space in a direction perpendicular to the first direction and/or in the second direction, and/or an output portion of a/the print head of the printing device (for example formed by a plurality of print nozzles of the print head) may be elongated in a direction perpendicular to the second direction and/or in the first direction, and/or an output region of the print head may, in a direction perpendicular to the second direction and/or in the first direction, be shorter than the construction space (in that direction) and/or shorter than the distance to be travelled by the coating device, for example substantially half the size or less than the distance to be travelled by the coating device. For example, the length of the output region of the print head may, in the first direction, be 65% or less of the length of the construction space in the first direction, for example 60% or less, for example 55% or less, for example 50% or less, for example 45% or less, for example 40% or less, for example 35% or less. For example, the length of the output region of the print head, in the first direction, may be 10% or more of the length of the construction space in the first direction, for example 15% or more, for example 20% or more, for example 25% or more, for example 30% or more. For example, the length of the output region of the print head in the first direction may be in a range of 65%-10% of the length of the construction space in the first direction, for example, in a range of 60%-15%, for example, in a range of 55%-15%. For example, the output region of the print head may be selected to be greater than or equal to an extension of a respective print section (see above) in the first direction, for example slightly greater than a respective print section, for example 20% greater, for example 15% greater, for example 10% greater, for example 5% greater. In this case, not all print nozzles of the print head are required for printing a print section, for example not those that are located at an edge portion of the print head.

Alternatively or in addition, according to an embodiment of the 3D printer, the first direction and the second direction may intersect, thereby forming an angle, for example an angle of substantially 90° (substantially may mean for example: +/−25°, for example +/−20°, for example +/−15°, for example +/−10°, for example +/−5°), and/or the construction space may be formed to be rectangular in a plan view, for example with two long and two short sides, wherein, for example, the first direction is substantially parallel to the long sides of the construction space (substantially, in this respect, may, for example mean a deviation of +/−10°, for example +/−5°), and/or the distance to be travelled by the coating device may be greater than a single distance to be travelled by the printing device across the construction space along the second direction, for example by at least the factor of 1.2, for example by at least the factor of 1.3, for example by at least the factor of 1.4, for example by at least the factor of 1.5, and/or a single distance to be travelled by the printing device across the construction space along the second direction may be 1.0 m to 1.4 m, for example 1.2 m.

Alternatively or in addition, according to an embodiment of the 3D printer, the control device may be configured to move the coating device and the printing device, for example the print head, starting from the same and/or a common, first side—as seen in the first direction—across the construction space to an opposite, second side—as seen in the first direction—thereby dispensing particulate material and flowable treatment agent, respectively. Optionally, the coating device and the printing device may then be moved from the second side back to the first side, thereby again dispensing particulate material and flowable treatment agent, respectively (for example, if the coating device is operated bidirectionally). These processes may be repeated, for example several times.

The print head and/or the printing device may, for example, be arranged in a vertical direction at a distance from the coating device and may be movable in a separate plane, for example a horizontal plane.

For example, the control device may be configured to displace/move the print head and/or print device at a higher speed than the coating device.

For example, the coating device and the printing device and/or the print head may be mechanically decoupled from each other and/or may be movable separately. For example, the coating device may be movable in the first direction while the print head and/or printing device may be movable in the second direction at the same time.

For example, the coating device may be movable along a coating device linear guide structure, for example by means of a carriage to which the coating device is attached.

Selective solidification of several adjoining construction material layers in a respective partial region thereof may be achieved, for example, by binder jetting, i.e. by (selectively) adhering the (particulate) construction material with/using a binder.

The principle described above according to a first aspect of the invention may also be applied to and is particularly suitable for a so-called multi-construction space 3D printer, for example a 3D printer having two, three or more adjacent construction spaces.

According to a further, second aspect of the present invention, a 3D printer (multi-construction space 3D printer) is provided, which is configured to build up in a first construction space and in a second construction space adjacent thereto (for example arranged at a distance therefrom) one or more three-dimensional components in layers, wherein a first coating device is assigned to the first construction space and a second coating device is assigned to the second construction space, which are movable in a first direction (for example, first horizontal direction) across the first construction space and in a third direction (for example, third horizontal direction) substantially parallel to the first direction (substantially may mean a deviation of +/−10°, for example +/−5°), respectively, across the second construction space, in order to supply the respective construction space with construction material in the form of a uniform construction material layer of the construction material to be solidified. The respective construction space may, for example, be arranged above an associated construction platform and/or may be (co)formed/defined by such a platform, possibly together with an associated construction box (see above), and the respective coating device may, for example, be formed by a container coating device (see above), for example a slot coating device. For example, the first and second coating devices may be operable separately and/or independently of each other. The 3D printer further comprises a common (i.e., shared by the two construction spaces or serving both construction spaces) printing device which is movable in a second direction (e.g. second horizontal direction), which is arranged at an angle (e.g. respectively at an angle of substantially 90°) with respect to the first and third directions, across the first construction space and the second construction space to output in a controlled manner a flowable treatment agent to a partial region of a previously applied construction material layer of the first construction space and a partial region of a previously applied construction material layer of the second construction space. The 3D printer further comprises a control device configured to control the first coating device, the second coating device and the common printing device in such a way that a travel of the first coating device in the first direction across the first construction space and a travel of the second coating device in the third direction across the second construction space overlap in time with at least one of a travel of the printing device in the second direction across the first construction space and a travel of the printing device in the second direction across the second construction space, and/or that the supply of construction material to the first construction space by the first coating device and the supply of construction material to the second construction space by the second coating device overlap in time with the controlled output of flowable treatment agent to a previously applied construction material layer of at least one of the first construction space and the second construction space. For example, the control device may be configured to move the first coating device and the second coating device substantially side-by-side/parallelized/simultaneously across the first construction space and/or the second construction space (substantially may mean, for example, that there is a time overlap of greater than or equal to 90%, for example greater than or equal to 95%).

In other words, according to this aspect of the invention, it is possible to sectionwise/temporarily at the same time/parallel coat in the first construction space, coat in the second construction space and print in one of the first and second construction spaces. This means that the printing operation performed by the common printing device is parallelized with the two coating operations. For this purpose, analogous to the description for the first aspect, the printing device may operate in the back of the two coating devices, or the two coating devices may operate in the back of the printing device. For example, the common printing device may be configured to selectively print the first construction space and the second construction space in several print sections which are arranged one after the other as seen in the first direction and are processed one after the other, a respective print section being travelled along the second direction by the printing device and extending across both the first and second construction spaces.

The principle of overlap described above can thus be applied to two (or more; it should be understood that the number of construction spaces can be extended as desired) adjacent construction spaces and can be realized with a common printing device (which serves all construction spaces) and two coating devices (and/or one coating device per construction space) in order to save components or achieve cost savings.

For example, the control device may control the first coating device, the second coating device and the common printing device in such a way that also according to this embodiment, there is a degree of overlap of greater than or equal to 20%, for example greater than or equal to 25%, for example greater than or equal to 30%, for example greater than or equal to 35%, for example greater than or equal to 40%, for example greater than or equal to 45%, for example greater than or equal to 50%, for example greater than or equal to 55%, for example greater than or equal to 60%. The degree of overlap can be calculated, for example, as follows: $t_{B,D}/t_B*100$, where $t_B$ is the time it takes to coat in the two/all construction spaces (i.e., the time during which the first coating device and the second coating device move across the respective construction space to apply a layer), and where $t_{B,D}$ is the time during which both printing and coating take place, and/or during which the coating devices and the printing device travel across the construction space (for example including possible turning sections between single travels of the printing device across the construction space), in a way to overlap in time. If, for example, the printing device operates in the back of the coating devices, the degree of overlap can be calculated, for example, from the quotient of the remaining coating time from the start of printing (printing device reaches construction space in order to move across it in the second direction), divided by the total coating time (until a complete layer has been applied in the first and second construction spaces). If, for example, the coating device operates in the back of the printing device, the degree of overlap can be calculated, for example, from the quotient of the remaining printing time from the start of coating (point in time from which the first coating device and the second coating device have reached their respective associated construction space in order to move across it in the first direction), divided by the total coating time. Analogously, a degree of overlap can be calculated for the case of a third construction space with a third coating device, a fourth construction space with a fourth coating device, a fifth construction space with a fifth coating device, etc.

According to this aspect of the present application, the performance and output of the 3D printer can be further increased while maintaining an appropriate component quality and at reasonable cost.

In general, what was described for the first aspect also applies to the multi-construction space 3D printer.

In this respect, according to an embodiment of the 3D printer (multi-construction space 3D printer), the printing device may comprise a print head which is displaceable in the first direction, the control device being configured to move the print head, to selectively print a construction material layer of the first construction space and a construction material layer of the second construction space, several times (in an offset/displaced way) in the second direction (one after the other) across the first and second construction spaces, for example in such a way that the print head moves in an altogether meandering pattern across the first and second construction spaces, for example along a U-shaped path or an S-shaped path (the printing device may, for example, be configured as described for the first aspect, the print head carrier being movable along the linear guide in the second direction across the first and second construction spaces), and/or a distance to be travelled by the first coating device across the first construction space along the first direction may be greater than or equal to a (single) distance to be travelled by the printing device across the first construction space along the second direction, for example at least greater by the factor of 1.2, and/or the dimension of the first construction space in the first direction may be greater than or equal to the dimension of the first construction space in the second direction (as described in detail for the first aspect, this arrangement is in the end favorable as to the component quality, the costs, the complexity and the duration of the entire manufacturing process), and/or a distance to be travelled by the second coating device across the second construction space along the third direction may be greater than or equal to a (single) distance to be travelled by the printing device across the second construction space along the second direction, for example at least by the factor of 1.2 greater, and/or the dimension of the second construction space in the third direction may be greater than or equal to the dimension of the second construction space in the second direction (as described in detail for the first aspect, this arrangement is in the end favorable as to the component quality, the costs, the complexity and the duration of the entire manufacturing process), and/or the first coating device and the second coating device may each be configured as a bidirectional coating device and/or the common printing device may be configured as a bidirectional printing device.

Alternatively or in addition, for example, according to an embodiment of the 3D printer (multi-construction space 3D printer), the first construction space and the second construction space may have substantially the same shape and size and/or the first construction space and the second construction space may be arranged one after the other as viewed in the second direction, and/or the first construction space and the second construction space may be each formed to be rectangular, for example with two long and two short sides, wherein the first and second construction spaces are arranged with two long sides adjacent to each other and/or wherein the first direction and the third direction are substantially parallel to the long sides of the first construction space and the long sides of the second construction space, respectively, (substantially, in this respect, may, for example, mean a deviation of +/−10°, for example +/−5°), and/or an output region of the first coating device may, in a direction perpendicular to the first direction and/or in the second direction completely span the first construction space, and/or an output region of the second coating device may, in a direction perpendicular to the third direction and/or in the second direction completely span the second construction space, and/or an output region of a print head of the printing device may be elongated in a direction perpendicular to the second direction and/or in the first direction, and/or an output region of the print head may be shorter than the first construction space and/or shorter than the distance to be travelled by the first coating device, for example substantially half the size or less, in a direction perpendicular to the second direction and/or in the first direction (also see the other statements as to the first aspect, which equally apply to this aspect), and/or a single distance to be travelled by the printing device across the first construction space along the second direction (H2) may be 1.0 m to 1.4 m, for example 1.2 m, and/or a single distance to be travelled by the printing device across the second construction space along the second direction may be 1.0 m to 1.4 m, for example 1.2 m, and/or the control device may be configured to move the first coating device, the second coating device and the common printing device, for example the print head, starting from a common, first side—as seen in the first and third directions—across the first and second construction spaces to an opposite, second side—as seen in the first and third directions—thereby dispensing particulate material and/or flowable treatment agent, and wherein optionally subsequently the first coating device, the second coating device and the common printing device, for example the print head, are moved starting from the second side back to the first side, thereby dispensing once again particulate material and/or flowable treatment agent.

The common print head may, for example, be arranged in a vertical direction at a distance from the first coating device and the second coating device and may be movable in a separate plane, for example a horizontal plane.

The common print head may, for example, be moved by the control device at a higher speed (for example maximum speed and/or average speed) than the respective coating device.

For example, according to an embodiment, the 3D printer (multi-construction space 3D printer) may further comprise a third construction space arranged adjacent to the second construction space, and a third coating device assigned to the third construction space and movable across the third construction space along a fourth direction substantially parallel to the first direction to provide the third construction space with construction material in the form of a uniform construction material layer of the construction material to be solidified. For example, the 3D printer may be configured to build one or more three-dimensional components in layers in the third construction space. The common printing device may, for example, be movable in the second direction across the third construction space in order to output a flowable treatment agent in a controlled manner to a partial region of a previously applied construction material layer of the third construction space. An output region of the third coating device may, for example, completely span the third construction space in a direction perpendicular to the fourth direction. A distance to be travelled by the third coating device across the third construction space along the fourth direction may, for example, be greater than or equal to a (single) distance to be travelled by the printing device across the third construction space along the second direction, for example at least greater by the factor of 1.2, and/or the dimension of the third construction space in the fourth direction may, for example, be greater than or equal to the dimension of the third construction space in the second direction, (as described in detail for the first aspect, this arrangement has, in the end, a favorable effect on component quality, costs, complexity and the duration of the entire manufacturing process). The control device may be configured, for example, to control the first coating device, the second coating device, the third coating device and the common printing device in such a way that a respective travel of the coating devices across the associated construction space overlaps in time with the travel of the common printing device in the second direction across at least one of the construction spaces, and/or that the supply of construction material to the respective construction space by the associated coating device overlaps in time with the controlled dispensing of flowable treatment agent to a previously applied construction material layer of at least one of the construction spaces.

For such a 3D printer (multi-construction space 3D printer) with three construction spaces and three coating devices, the above information provided as to a 3D printer with one construction space and one coating device or to a 3D printer with two construction spaces and two coating devices applies analogously.

The third construction space may, for example, be configured like the first and/or second construction space. The third coating device may, for example, be configured like the first and/or second coating device. The third coating device may, for example, be configured as a bidirectional coating device. The common printing device may, for example, be configured as a bidirectional printing device. For example, the first construction space, the second construction space and the third construction space may have substantially the same shape and size. The first construction space, the second construction space and the third construction space may, for example, be arranged one after the other when viewed in the second direction. The first construction space, the second construction space and the third construction space may, for example, each be formed to be rectangular, for example with two long and two short sides, wherein, for example, the first and second construction spaces are arranged with two long sides adjacent to each other and the second and third construction spaces are arranged with two long sides adjacent to each other and/or wherein, for example, the first direction, the third direction and the fourth direction are substantially parallel to the long sides of the first construction space and/or the long sides of the second construction space and/or the long sides of the third construction space (substantially may, in this respect, for example mean a deviation of +/−10°, for example, +/−5°). The control device may, for example, be configured to move the first coating device, the second coating device, the third coating device and the common printing device, for example the print head, starting from a common, first side—as seen in the first, third and fourth directions—across the first, second and third construction space to an opposite, second side—as seen in the first, third and fourth directions—thereby dispensing particulate material and flowable treatment agent, respectively, wherein optionally subsequently the first coating device, the second coating device, the third coating device and the common printing device, for example the print head, are moved from the second side back to the first side, thereby again outputting particulate material and flowable treatment agent, respectively.

The printing device may for example comprise a print head displaceable in the first direction, the control device being configured to move the print head several times/repeatedly (in a displaced/offset manner) in the second direction (successively) across the first, second and third construction spaces for selectively printing a construction material layer of the first construction space, a construction material layer of the second construction space and a construction material layer of the third construction space, for example such that the print head travels in a generally meandering pattern across the first, second and third construction spaces, for example along a U-shaped path or an S-shaped path (the printing device may, for example, be configured as described for the first aspect, with the print head carrier being movable along the linear guide in the second direction across the first, second and third construction spaces).

The common print head may, for example, be arranged in the vertical direction at a distance from the first coating device, the second coating device and the third coating device and be movable in a separate plane, for example a horizontal plane. For example, the common print head may be movable by the control device at a higher speed (for example maximum speed and/or average speed) than the respective coating devices.

Needless to say, the 3D printer (multi-construction space 3D printer) may be supplemented/extended, for example, by a fourth construction space and a fourth coating device or by n construction spaces and n coating devices, where n is a natural number. For such a multi-construction space 3D printer with four or more construction spaces and four or more coating devices, the information provided above with respect to a 3D printer having one, two and/or three construction spaces and coating devices applies analogously.

For example, the coating devices (for example, the first coating device and/or the second coating device and/or the third coating device) and the common printing device or the common print head may be mechanically decoupled from each other and/or movable separately. For example, the coating devices (for example, the first coating device and/or the second coating device and/or the third coating device) may be movable in the respective direction (for example, first direction and/or third direction and/or fourth direction) while the printing device and/or the print head is simultaneously movable in the second direction.

The coating devices (for example the first coating device and/or the second coating device and/or the third coating device) may for example be moved along a coating device linear guide structure, for example by means of one or more carriages to which the coating device(s) is/are attached.

The coating devices (for example the first coating device and/or the second coating device and/or the third coating device) may, for example, be movable simultaneously (for example in parallel, for example side by side) and/or together across the respectively assigned construction space. The coating devices (for example the first coating device and/or the second coating device and/or the third coating device) may, for example, be movable at the same speed across the respectively assigned construction space. The travel of the coating devices (for example the first coating device and/or the second coating device and/or the third coating device) across the respectively assigned construction space may, for example, start and/or end simultaneously.

For example, the coating devices (for example the first coating device and/or the second coating device and/or the third coating device) may be mechanically coupled and/or connected.

A construction in layers of one or more three-dimensional components in a construction space can be achieved, for example, by selective solidification of several adjoining construction material layers in a respective partial region thereof, for example by binder jetting, i.e. by (selectively) adhering the (particulate) construction material with a binder.

According to a further, third aspect of the present invention, a generative manufacturing process is provided for producing at least one three-dimensional component, e.g. a casting mold or a foundry core, in a construction space of a 3D printer (for example a 3D printer according to the first aspect). The process comprises: forming layers of particulate construction material lying one upon the other, e.g. containing sand particles, using a coating device which is moved in a first direction across the construction space to apply a respective layer, and selectively printing one or more adjoining construction material layers in a respective partial region thereof using a printing device which is moved in a second direction across the construction space to output in a controlled manner a flowable treatment agent to a partial region of a previously applied construction material layer, which contributes to a selective solidification thereof. In the process, the coating device and the printing device are moved across the construction space with an overlap in time and/or the coating device and the printing device supply the construction space with construction material and with flowable treatment agent, respectively, with an overlap.

In other words, printing and coating are temporarily carried out simultaneously, i.e. the printing process (selective printing of a layer) and the coating process (application of a layer) are partially parallelized in the process. For example, a layer not yet completely applied in the first direction can be printed using the printing device, i.e. the printing process can start before the coating process is completed, or alternatively, a (next) coating process can be started before a previously applied layer has been completely printed. The selective printing of a respective layer can be carried out as described above by forming print sections which are arranged one after the other as seen in the first direction and are processed one after the other, wherein for a respective print section the printing device is moved along the second direction across the construction space.

According to an embodiment, in the generative manufacturing process:

the printing device may comprise a print head which is displaceable in the first direction, the print head being moved several times (in a displaced manner) in the second direction across the construction space for selectively printing a construction material layer, for example in such a way that the print head moves across the construction space in a generally meandering pattern, for example along a U-shaped path or an S-shaped path, and/or a distance to be travelled by the coating device across the construction space along the first direction may be greater than or equal to a distance travelled by the printing device when traveling once across the construction space along the second direction (for example, coating and/or forming a layer may be done along a distance greater than or equal to a distance along which printing of a print section is done in the second direction); and/or a bidirectional coating device may used as a coating device, and/or particulate construction material may be dispensed by means of the coating device during a journey in the first direction and during a return journey in the first direction, and/or a bidirectional printing device may be used as a printing device, and/or flowable treatment agent may be dispensed by means of the printing device during a journey in the second direction and during a return journey in the second direction, and/or the coating device and the print head may, starting from a common, first side—as seen in the first direction—be moved across the construction space to an opposite, second side—as seen in the first direction—thereby dispensing particulate material and flowable treatment agent, respectively, wherein optionally subsequently the coating device and the print head are moved from the second side back to the first side, thereby again dispensing particulate material and flowable treatment agent, respectively.

Alternatively or in addition, according to an embodiment of the generative manufacturing process, an output region of the coating device may completely span the construction space in a direction perpendicular to the first direction and/or in the second direction, and/or an output region of a print head of the printing device may be elongated in a direction perpendicular to the second direction and/or in the first direction, and/or an output region of the print head may, in a direction perpendicular to the second direction and/or in the first direction, be shorter than the construction space and/or shorter than the distance to be travelled by the coating device, for example substantially half the size or less, and/or the first direction and the second direction may intersect, thereby forming an angle, for example an angle of substantially 90°, and/or the construction space may be formed to be rectangular in a plan view, for example with two long and two short sides, the first direction for example being substantially parallel to the long sides of the construction space, and/or the distance to be travelled by the coating device may be greater than a single distance to be travelled by the printing device across the construction space along the second direction, for example by at least the factor of 1.2, and/or a single distance to be travelled by the printing device across the construction space along the second direction may be 1.0 m to 1.4 m, for example 1.2 m.

According to a further, fourth aspect of the present invention, a generative manufacturing process is provided for producing at least one three-dimensional component, e.g. a mold or a foundry core, in a first construction space of a 3D printer (for example 3D printer according to the second aspect) and at least one three-dimensional component, e.g. a mold or a foundry core, in a second construction space of the 3D printer which is arranged adjacent to the first construction space, the method comprising:

forming layers of particulate construction material lying one upon the other, e.g. containing sand particles, in the first construction space using a first coating device which is moved in a first direction across the first construction space to apply a respective layer, forming layers of particulate construction material lying one upon the other, e.g. containing sand particles, in the second construction space using a second coating device which is moved across the second construction space in a third direction substantially parallel to the first direction to apply a respective layer, and selectively printing several adjoining construction material layers in a respective partial region thereof in the first construction space and selectively printing several adjoining construction material layers in a respective partial region thereof in the second construction space using a common printing device moved across the first construction space and the second construction space in a second direction which is arranged at an angle to the first and third directions, to output a flowable treatment agent in a controlled manner to a partial region of a previously applied construction material layer in the first construction space and to a partial region of a previously applied construction material layer in the second construction space, which agent contributes to a selective solidification of the respective construction material layer.

In this respect, in the process, a travel of the first coating device in the first direction across the first construction space and a travel of the second coating device in the third direction across the second construction space are carried out to overlap in time with at least one of a travel of the common printing device in the second direction across the first construction space and a travel of the common printing device in the second direction across the second construction space, and/or the supply of construction material to the first construction space by the first coating device and the supply of construction material to the second construction space by the second coating device are carried out with a time overlap with the controlled dispensing of flowable treatment agent onto a previously applied construction material layer of at least one of the first construction space and the second construction space.

In other words, according to this aspect of the invention, it is possible to temporarily simultaneously coat in the first construction space, coat in the second construction space and print in one of the first and second construction spaces.

In other words, the printing process performed by the common printing device is parallelized with the two coating processes.

According to an embodiment of the generative manufacturing process, the common printing device may comprise a common print head which is displaceable in the first direction, the common print head being moved several times in the second direction across the first and second construction spaces for selectively printing a construction material layer of the first construction space and a construction material layer of the second construction space, for example in such a way that the print head moves in a generally meandering pattern across the first and second construction spaces, for example along a U-shaped path or an S-shaped path, and/or a distance travelled by the first coating device across the first construction space along the first direction may be greater than or equal to a (single) distance travelled by the printing device across the first construction space along the second direction, for example at least greater by the factor of 1.2, and/or a distance travelled by the second coating device across the second construction space along the third direction may be greater than or equal to a (single) distance travelled by the printing device across the second construction space along the second direction, for example at least greater by the factor of 1.2, and/or the first coating device and the second coating device may each be operated as a bidirectional coating device and/or the printing device may be operated as a bidirectional printing device and/or the first construction space and the second construction space may have substantially the same shape and size and/or the first construction space and the second construction space, as viewed in the second direction, may be arranged one after the other, and/or the first construction space and the second construction space may each be formed to be rectangular, for example with two long and two short sides, the first and second construction spaces being arranged with two long sides adjacent to one another and/or the first direction and the third direction being substantially parallel to the long sides of the first and the second construction space, respectively, and/or an output region of the first coating device may completely span the first construction space in a direction perpendicular to the first direction and/or in the second direction, and/or an output region of the second coating device may completely span the second construction space in a direction perpendicular to the third direction and/or in the second direction, and/or an output portion of a print head of the printing device may be elongated in a direction perpendicular to the second direction and/or in the first direction, and/or an output region of the print head may, in a direction perpendicular to the second direction and/or in the first direction be shorter than the first construction space and/or shorter than the distance to be travelled by the first coating device, for example substantially half the size or less, and/or a single distance to be travelled by the printing device across the first construction space along the second direction may be 1.0 m to 1.4 m, for example 1.2 m, and/or a single distance to be travelled by the printing device across the second construction space along the second direction may be 1.0 m to 1.4 m, for example 1.2 m, and/or the first coating device, the second coating device and the print head may be moved from a common, first side—as seen in the first and third directions—across the first and second construction spaces to an opposite, second side—as seen in the first and third directions—thereby dispensing particulate material and flowable treatment agent, respectively, and wherein optionally subsequently the first coating device, the second coating device and the print head are moved from the second side back to the first side, thereby dispensing again particulate material and flowable treatment agent, respectively.

Additional features and advantages of the present invention are illustrated by or are explained in detail in the enclosed drawings which are incorporated herein, as well as the following detailed description, which together serve to explain certain principles of the present invention.

The invention will hereinafter be described in more detail by means of various embodiments and with reference to the Figures.

FIG. 1 shows a schematic view of a 3D printer according to a first embodiment of the invention.

FIG. 2 shows another schematic view of the 3D Printer according to the first embodiment.

FIG. 3 shows a schematic view of a 3D printer according to a second embodiment of the invention.

FIGS. 4 and 5 show schematic views of a 3D printer according to a third embodiment of the invention.

In the following detailed description, reference is made to the enclosed Figures which are incorporated therein and in which specific embodiments are shown by way of illustration, according to which the invention can be performed. In this respect, the terms "up", "down", "front", "rear", etc. are used with reference to the orientation in the described Figures. As components of embodiments may be positioned in a number of different orientations, the terminology indicating the different directions serves for illustration and shall not be restrictive in any way. It shall be understood that other embodiments may be used and structural or logical changes may be made without deviating from the scope of protection of the present invention. It goes without saying that the features of the various exemplary embodiments described herein may be combined unless specified otherwise. Thus, the following detailed description should not be understood in a restrictive sense and the scope of protection of the invention shall be defined by the attached claims.

In this description, terms such as "connected", "attached" or "coupled" may be used to describe both a direct and indirect connection, a direct or indirect attachment and a direct or indirect coupling.

In the Figures, identical or similar elements are provided with identical reference numbers where appropriate.

FIGS. 1 and 2 each show a schematic view of a 3D printer 1 according to a first embodiment of the invention.

As shown in FIG. 1, the 3D printer 1 comprises, according to the first embodiment, a construction space B1 which may be arranged above a construction platform not shown, which may be formed to be height-adjustable, for example. In this respect, the construction space B1 may be free/unlimited on the circumference (in this case the layers applied to the construction platform and/or their edge areas may define the construction space on the circumference) or may be limited by a vertical wall structure which may be formed by a so-called construction box, for example a stationary or movable construction box. In the plan view, the construction space B1 is here by way of example formed to be rectangular, with two long sides and two short sides.

The 3D printer 1 is configured to build up at least one three-dimensional component in layers in the construction space B1, e.g. a casting mold or a foundry core, by forming construction material layers of particulate construction material lying one upon the other, e.g. containing sand particles, and selectively solidifying several adjoining construction material layers in a respective partial region thereof.

For this purpose, the 3D printer 1 comprises a coating device 3 which is movable in a first direction $H_1$ across the construction space B1 in order to supply construction material to the construction space B1 in the form of a uniform construction material layer of the construction material to be solidified over the entire surface, and a printing device 5 which is movable in a second direction $H_2$ across the construction space B1 in order to output a flowable treatment agent in a controlled manner to a partial region of a previously applied construction material layer, which agent contributes to a selective solidification thereof. The first direction and the second direction intersect here by way of example at an angle of 90°.

By way of example, the coating device 3 is here configured in the form of a container coating device and/or as a bidirectional coating device, which both during a journey in the first direction (FIG. 1) as well as during a return journey in the first direction (FIG. 2) can apply an even construction material layer of the construction material to be solidified. The container coating device 3 comprises an opening and/or slot (not shown) which extends in the second direction $H_2$ across the entire construction space B1, so that the output region of the coating device completely spans/covers the construction space in the second direction. In addition, the coating device 3 is movable along a linear guide (not shown) in the first direction $H_1$ across the construction space B1. A suitable coating device is described, for example, in DE 10 2014 112 469 A1 or WO 2016/030375 A2, which are referred to in this respect and the disclosure content of which is included by reference herein.

By way of example, the printing device 5 is here configured as a bidirectional printing device which can selectively print a construction material layer or a print section thereof both during a journey in the second direction (lowest, horizontal arrow in FIG. 1) and during a return journey in the second direction (middle, horizontal arrow in FIG. 1). Further details of the printing device 5 are described below.

The extension of the construction space B1 in the second direction is marked $S_2$ and corresponds here to a short rectangle side, and the extension of the construction space B1 in the first direction is marked $S_1$ and corresponds here to a long rectangle side. Thus, according to this embodiment, coating is carried out along the long side and printing is carried out along the short side, i.e. the distance $S_1$ to be travelled by the coating device 3 across construction space B1 along the first direction $H_1$ is greater than the distance $S_2$ which is travelled by the printing device 5 when travelling once across the construction space B1 along the second direction $H_2$.

The 3D printer 1 also comprises a control device C, which is connected and/or communicates with the coating device 3 and the printing device 5 and which is configured to control the coating device 3 and the printing device 5 in such a way that they move across the construction space B1 in a way to overlap in time and/or that they, in an overlapping manner, supply the construction space B1 with construction material or dispense flowable treatment agent in a controlled way to a previously applied construction material layer. A degree of overlap can be set here, for example, to a value of greater than or equal to 30%, for example greater than or equal to 40%, for example greater than or equal to 50%.

For this purpose, the layer to be printed is divided into several print sections (here three), which are arranged one after the other when viewed in the first direction and are processed one after the other by the printing device 5 (each in the second direction), so that the printing device 5 moves across the construction space altogether several times in the second direction $H_2$.

According to this exemplary embodiment, the printing device 5 comprises a print head 7 which can be displaced in the first direction $H_1$, for example along a carrier structure 9, which itself in turn is displaceable along a (not shown) linear guide in the second direction $H_2$ across the construction field B1. In this respect, the control device C is configured to move the print head 7 several times, in a displaced/offset manner, in the second direction $H_2$ across the construction space B1 for selective printing of a construction material layer, here in such a way that the print head 7 is moved in an altogether meandering pattern across the construction space B1, here along a (mirror-inverted) S-shaped path and/or a path with three parallel individual routes in the second direction. The print head 7 and/or an output region thereof is here elongated in the first direction $H_1$, but formed to be shorter than the extension $S_1$ of the construction space B1 in the first direction, and may have a length of 30%-40% of the extension $S_1$, for example.

In the following, the operating principle of the 3D printer 1 will be explained by means of a general view of FIGS. 1 and 2.

First of all—as indicated in FIG. 1—the coating device 3 is moved in the first direction $H_1$ across the construction space B1, starting from its position shown in FIG. 1 ("below"), in order to supply the construction space B1 with construction material in the form of an even construction material layer of the construction material to be solidified. Still before the coating device has completely passed across the construction space B1 and before the coating device 3 has reached the position ("top") shown in FIG. 2, for example when the coating device 3 has substantially reached the center of the construction space B1 in the first direction, the print head 7, starting from its position shown in FIG. 1 ("bottom right") is moved in the second direction $H_2$ across the construction space B1 (lower, horizontal arrow $H_2$ in FIG. 1) in order to dispense a flowable treatment agent in a controlled way to a first/lower print section of the construction material layer applied by the coating device 3, which contributes to a selective solidification of the layer and/or of the print section. In this respect, the movement of the print head 7 is effected by moving the carrier structure 9 along the linear guide (not shown). In this context, moving the print head 7 can basically begin as soon as the coating device 3 has passed the first print section. The print head 7 is displaced in the first direction $H_1$ so that it is centered with respect to the carrier 9, and then the print head 7 is moved again by means of the carrier 9 in the second direction $H_2$ across the construction space B1 (middle, horizontal arrow $H_2$ in FIG. 1) in order to dispense flowable treatment agent in a controlled manner to a second/middle print section of the construction material layer. Then, the print head 7 is displaced again in the first direction so that it is positioned at the top with respect to the carrier 9, and then the print head 7 is moved again in the second direction $H_2$ across the construction space B1 (upper, horizontal arrow $H_2$ in FIG. 1) to dispense flowable treatment agent in a controlled way to a third/upper print section of the construction material layer. During the described moving and displacing of the print head 7, the coating device 3 continues to be moved in the first direction to complete the application of the layer. Thus, the print head operates "in the back" of the coating device 3, and the control device C is configured to move the coating device 3 and the printing device 5 and print head 7, respectively, from a common, first/lower side—as seen in the first direction—(see FIG. 1) across the construction space to an opposite, second/upper side—as seen in the first direction—(see FIG. 2), thereby dispensing particulate material and flowable treatment agent, respectively.

After the layer applied by the coating device 3 has been completely travelled by the printing device and/or selectively printed, the application and selective printing of a next layer can take place. For this purpose, the coating device 3, starting from its position shown in FIG. 2 ("top"), can move in the first direction $H_1$ across the construction space B1 (now from top to bottom) in order to supply the construction space B1 with construction material in the form of a uniform construction material layer of the construction material to be solidified. Even before the coating device has completely travelled across the construction space B1 and before the coating device 3 has reached the position shown in FIG. 1, the print head 7, starting from its position shown in FIG. 2 ("top left"), is moved in the second direction $H_2$ across the construction space B1 (top, horizontal arrow H2 in FIG. 2) in order to dispense flowable treatment agent in a controlled manner to a first/upper print section of the construction material layer applied by coating device 3. Next, the print head 7 is again displaced in the first direction so as to be centered with respect to the carrier 9, and then the print head 7 is again moved in the second direction $H_2$ across the construction space B1 (middle, horizontal arrow $H_2$ in FIG. 2) to dispense flowable treatment agent to a second/middle print section of the construction material layer. Then, the print head 7 is displaced again in the first direction so that it is positioned at the bottom with respect to the carrier 9, and then the print head 7 is moved again in the second direction $H_2$ across the construction space B1 (lower, horizontal arrow H2 in FIG. 2) to dispense flowable treatment agent in a controlled way to a third/lower print section of the construction material layer. While moving and displacing the print head 7, the coating device 3 continues to be moved in the first direction to complete the application of the next layer. Thus, the print head 7 again operates "in the back" of the coating device 3, and the control device C is configured to move the coating device 3 and the printing device 5 from the second side back to the first side, thereby again dispensing particulate material and flowable treatment agent, respectively. The sequence shown in FIGS. 1 and 2 can be repeated as often as required.

FIG. 3 shows a schematic view of a 3D printer 10 according to a second embodiment of the invention.

A description of features similar or identical to those of the 3D printer 1 of the first embodiment shall in part be omitted in the following, and the focus shall be on the description of additional or alternative features.

As can be seen in FIG. 3, the 3D printer 10 additionally comprises a second construction space B2, which here, by way of example, is configured like the first construction space B1 and has the same shape and size. In this respect, the two construction spaces B1 and B2 are arranged with two long rectangle sides adjacent to each other. In addition, the 3D printer 10 comprises a second coating device 13, which here, by way of example, is configured like the first coating device 3 (bidirectional container coating device) and can be moved along a third direction $H_3$ across the second construction space B2. The two directions $H_1$ and $H_3$ are here, by way of example, substantially parallel to each other as well as parallel to the long rectangle sides, and intersect the second direction $H_2$ in each case at an angle of substantially 90°. In contrast to the first embodiment, the selective printing of a layer according to the second embodiment is carried out with/in two print sections, for example. The dimension $S_{21}$ of the first construction space B1 in the second direction is substantially equal to the dimension $S_{22}$ of the second construction space B2 in the second direction, and the dimension $S_1$ of the first construction space B1 in the first direction is substantially equal to the dimension $S_3$ of the second construction space B2 in the third direction, wherein S21 is smaller than S1 and wherein S22 is smaller than S3. The dimensions $S_{21}$, $S_{22}$ may correspond to the short sides of the rectangle and the dimensions $S_1$, $S_3$ may correspond to the long sides of the rectangle. The print head 7 is moved here along a U-shaped path or a path with two parallel single distances in the second direction, and the print head 7 and/or an output region thereof may have a length of 45%-60% of the extension $S_1$ and/or $S_2$, for example.

The 3D printer 10 is configured to build up one or more three-dimensional components in layers in the first construction space B1 and in the adjacent second construction space B2, for which purpose the first coating device 3 is assigned to the first construction space B1 and the second coating device 13 is assigned to the second construction space B2, which are movable in the first direction $H_1$ across the first construction space B1 and in the third direction $H_3$ across the second construction space B2, respectively, in order to supply the respective construction space with construction material in the form of a uniform construction material layer of the construction material to be solidified. The 3D printer further comprises the printing device 5, which here functions as a common printing device, which is divided by the two construction spaces and which is movable (repeatedly, in an offset manner) in the second direction $H_2$ across the first construction space B1 and the second construction space B2 in order to dispense a flowable treatment agent in a controlled manner to a partial region of a previously applied construction material layer of the first construction space B1 and a partial region of a previously applied construction material layer of the second construction space B2.

The control device C is here additionally connected to the second coating device 13 and configured to control the first coating device 3, the second coating device 13 and the common printing device 5 in such a way that a travel of the first coating device 3 in the first direction $H_1$ across the first construction space B1 and a travel of the second coating device 13 in the third direction $H_3$ across the second construction space B2 overlap in time with at least one of a travel of the common printing device 5 in the second direction $H_2$ across the first construction space B1 and a travel of the common printing device 5 in the second direction $H_2$ across the second construction space B2, and/or that the supply of construction material to the first construction space B1 by the first coating device 3 and the supply of construction material to the second construction space B2 by the second coating device 13 overlap in time with the controlled dispensing of flowable treatment agent to a previously applied construction material layer of at least one of the first construction space B1 and the second construction space B2.

The operating principle of the 3D printer 10 is similar to that of the 3D printer 1 and in detail as follows.

First, the first coating device 3 and the second coating device 13, starting from their position shown in FIG. 3 ("below"), are moved in the first direction $H_1$ and the third direction $H_3$, respectively, across the first construction space B1 and the second construction space B2, respectively, in order to supply the respective construction space with construction material in the form of a uniform construction material layer of the construction material to be solidified. In this respect, the two coating devices 3, 13 may travel substantially in a synchronous way or in a substantially completely parallelized way across the respective construction field. Even before the two coating devices 3, 13 have completely traversed the respective construction space, for example when the coating devices 3, 13 have substantially reached the center of the respective construction space in the first direction, the print head 7, starting from its position shown in FIG. 3 ("bottom right"), is moved in the second direction $H_2$ successively across the second and the first construction space (in the order mentioned) (lower, horizontal arrow $H_2$ in FIG. 3) to dispense flowable treatment agent in a controlled way to a first/lower print section of the construction material layer applied by the coating device 3 and to a first/lower print section of the construction material layer applied by the coating device 13, which treatment agent contributes to a selective solidification of the respective layer and/or the respective print section. Then, the print head 7 is displaced in the first direction $H_1$ so as to be located at the top with respect to the carrier 9, and then the print head 7 is again moved (upper, horizontal arrow $H_2$ in FIG. 3) in the second direction $H_2$ by means of the carrier 9 across the first and second construction spaces (in that order) to dispense flowable treatment agent in a controlled way to a second/upper print section of the respective construction material layer. During the described moving and displacing of the print head 7, the first and second coating devices 3, 13 are moved further in first and third directions, respectively, to complete the application of the respective layer. Thus, the print head operates "in the back" of the first and second coating device 3, 13, and the control device C is configured to move the first coating device 3, the second coating device 13 and the common printing device 5 and the print head 7, respectively, from a common, first/lower side—as seen in the first direction—(see FIG. 3) across the construction space to an opposite, second/upper side—as seen in the first direction—thereby dispensing particulate material and flowable treatment agent, respectively.

After the layers applied by the coating devices 3, 13 have been completely traversed and/or printed selectively by the printing device 5, the application and selective printing of a next layer can take place in the respective construction space. For this purpose, the first and second coating devices 3 can again be moved across the respective construction space in the first direction $H_1$ and the third direction $H_3$, respectively, but now from top to bottom, in order to supply the respective construction space with construction material in the form of a uniform construction material layer of the construction material to be solidified. Even before the respective coating device has completely traversed its respective construction space and before the coating devices 3, 13 have reached the positions shown in FIG. 3, the print head 7 is moved, starting from a position "top right" in the second direction $H_2$ across the two construction spaces (against the upper, horizontal arrow $H_2$ in FIG. 3) in order to deliver flowable treatment agent in a controlled manner to a first/upper print section of the respective construction material layer. Then the print head 7 is displaced/offset again in the first direction so that it is positioned at the bottom with respect to the carrier 9, and then the print head 7 is moved again in the second direction $H_2$ across the two construction spaces (against the lower, horizontal arrow H2 in FIG. 3) to dispense flowable treatment agent in a controlled way to a second/lower print section of the respective construction material layer. While moving and displacing the print head 7, the coating devices 3, 13 are moved further down in the first direction to complete the respective application of the next layer. Thus, the print head 7 again operates "in the back" of the coating devices 3, 13, and the control device C is configured to move the first coating device 3, the second coating device 13 and the printing device 5 from the second/upper side back to the first/lower side, thereby again dispensing particulate material and flowable treatment agent, respectively. The described sequence can be repeated as often as required in this regard.

FIGS. 4 and 5 each show a schematic view of a 3D printer 100 according to a third embodiment of the invention.

A description of features similar or identical to those of the 3D printer 10 (or those of 3D printer 1) is partially omitted in the following, and the focus shall be on the description of additional or alternative features.

As shown in FIGS. 4 and 5, the 3D printer 100 additionally comprises a third construction space B3 which, by way of example, is configured like the first construction space B1 and the second construction space B2 and also has the same shape and size. The altogether three construction spaces B1, B2 and B3 are arranged with their long rectangle sides adjacent to each other. In addition, the 3D printer 100 comprises a third coating device 23 which, by way of example, here is configured like the first and second coating devices 3, 13 (bidirectional container coating device) and is movable along a fourth direction $H_4$ across the third construction space B3. The directions $H_1$, $H_3$ and $H_4$ are here, by way of example, substantially parallel to each other as well as parallel to the long sides of the rectangle, and intersect the second direction $H_2$ in each case at an angle of substantially 90°. Just like in the second embodiment, the selective printing of a respective layer is, by way of example, carried out with/in two print sections according to the third embodiment. The dimensions of the construction spaces in the second direction are substantially the same, and the dimensions of the construction spaces in the first, third and/or fourth directions are also substantially the same, the respective dimension in the second direction being smaller than the respective dimension in the first, third and/or fourth direction. The dimensions in the second direction may correspond to the short sides of the rectangle, and the dimensions in the first, third and/or fourth direction may correspond to the long sides of the rectangle. It goes without saying that the 3D printer may be supplemented by one or more additional construction spaces, which can be arranged to the right of and next to the construction space B3 in FIG. 5 (in the same orientation as the construction spaces shown), each of which may have an associated separate coating device and which may, in addition, also be served by the common printing device.

The 3D printer 100 is configured to build up one or more three-dimensional components in layers in each of the construction spaces B1, B2 and B3, for which purpose a separate coating device is assigned to each construction space. The 3D printer also comprises the printing device 5 which functions here as a common printing device, which is shared by all of the construction spaces B1, B2 and B3 and which is movable (repeatedly, in a displaced/offset way) in the second direction $H_2$ across all construction spaces B1, B2 and B3 in order to dispense a flowable treatment agent in a controlled manner to a partial region of a previously applied construction material layer of the respective construction space.

The control device C is here additionally connected to the third coating device 23 and is configured to control the coating devices 3, 13, 23 and the common printing device 5 in such a way that a respective travel of the coating devices across the associated construction space overlaps in time with the travel of the common printing device 5 in the second direction $H_2$ across at least one of the construction spaces, and/or that the supply of construction material to the respective construction space by the associated coating device overlaps in time with the controlled dispensing of flowable treatment agent to a previously applied construction material layer of at least one of the construction spaces.

The operating principle of the 3D printer 100 may be similar to that of the 3D printer 10. In this respect, it should be noted that in FIGS. 4 and 5, the printing device 5 on the one hand and the coating devices 3, 13, 23 on the other hand are arranged on different sides in the first direction, wherein, before the application and selective printing of a respective layer, the printing device 5 and the coating devices 3, 13, 23 would have to be arranged on a common side in the first direction. Alternatively, starting from FIG. 4, a layer can be applied in the respective construction space by means of the coating devices 3, 13, 23 by moving the coating devices downwards. The layer can then be selectively printed in the respective construction space by the print head 7 of the printing device 5 meandering in a U-shape across the construction spaces starting from the position shown in FIG. 4, as indicated by the two dotted arrows $H_2$ and the dotted connecting line. In this respect, the coating devices 3, 13, 23 in the back of printing device 5 can already start to apply a new layer as soon as printing device 5 has run sufficiently far, for example when/after the printing device 5 starts to selectively print the upper, second print section, and before the selective printing is completed.

Further embodiments of 3D printers according to the invention and generative manufacturing processes according to the invention are described below:

1. 3D printer which is configured to build up at least one three-dimensional component, e.g. a casting mold or a foundry core, in layers in a construction space B1 by forming construction material layers of particulate construction material lying one upon the other, e.g. containing sand particles, and selectively solidifying several adjoining construction material layers in a respective partial region thereof, comprising a coating device 3 which is movable in a first direction $H_1$ across the construction space B1 to supply construction material to the construction space B1 in the form of a uniform construction material layer of the construction material to be solidified, and a printing device 5 which is movable in a second direction $H_2$ across the construction space B1, in order to output a flowable treatment agent in a controlled manner to a partial region of a previously applied construction material layer, which treatment agent contributes to a selective solidification thereof, characterized by a control device C which is configured to control the coating device 3 and the printing device 5 in such a way that they travel across the construction space B1 in a way to overlap in time and/or that they, in an overlapping manner, supply construction material to the construction space B1 and dispense flowable treatment agent in a controlled manner to a partial region of a previously applied construction material layer, respectively.

2. 3D printer according to 1., wherein the printing device 5 comprises a print head 7 displaceable in the first direction $H_1$, and the control device C is configured to move the print head 7, to selectively print a construction material layer several times in the second direction $H_2$ across the construction space B1, for example in such a way that the print head 7 moves in an altogether meandering pattern across the construction space B1, for example along a U-shaped path or an S-shaped path.

3. 3D printer according to 1. or 2., wherein a distance $S_1$ to be travelled by the coating device 3 across the construction space B1 along the first direction $H_1$ is greater than or equal to a distance $S_2$ travelled by the printing device 5 when travelling once across the construction space B1 along the second direction $H_2$.

4. 3D printer according to any one of 1. to 3., wherein the coating device 3 is configured as a bidirectional coating device and/or wherein the printing device 5 is configured as a bidirectional printing device.

5. 3D printer according to any one of 1. to 4., wherein an output region of the coating device 3 completely spans the construction space B1 in a direction perpendicular to the first direction $H_1$ and/or in the second direction $H_2$, and/or an output region of a print head 7 of the printing device is elongated in a direction perpendicular to the second direction $H_2$ and/or in the first direction $H_1$, and/or an output region of the print head 7 is, in a direction perpendicular to the second direction $H_2$ and/or in the first direction shorter than the construction space B1 and/or shorter than the distance $S_1$ to be travelled by the coating device 3, for example substantially half the size or less.

6. 3D printer according to any one of 1. to 5., wherein the first direction $H_1$ and the second direction $H_2$ intersect, thereby forming an angle, for example an angle of substantially 90°, and/or the construction space B1 is formed to be rectangular in a plan view, for example with two long and two short sides, wherein for example the first direction $H_1$ is substantially parallel to the long sides of the construction space B1, and/or the distance $S_1$ to be travelled by the coating device 3 is greater than a single distance $S_2$ to be travelled by the printing device 50 across the construction space B1 along the second direction $H_2$, for example by at least the factor of 1.2, and/or wherein a single distance $S_2$ to be travelled by the printing device 5 across the construction space B1 along the second direction $H_2$ is 1.0 m to 1.4 m, for example 1.2 m.

7. 3D printer according to any one of 1. to 6., wherein the control device C is configured to move the coating device 3 and the printing device 5, for example the print head 7 of claim 2, from a common, first side—as seen in the first direction—across the construction space to an opposite, second side—as seen in the first direction—thereby dispensing particulate material and flowable treatment agent, respectively, and wherein optionally thereafter the coating device 3 and the printing device 5 are moved from the second side back to the first side, thereby again dispensing particulate material or flowable treatment agent.

8. 3D printer configured to build up one or more three-dimensional components in layers in a first construction space B1 and in a second construction space B2 adjacent thereto, wherein a first coating device 3 is assigned to the first construction space B1 and a second coating device 13 is assigned to the second construction space B2, which are movable in a first direction $H_1$ across the first construction space B1 and in a third direction $H_3$ substantially parallel to the first direction across the second construction space B2, respectively, in order to supply the respective construction space with construction material in the form of a uniform construction material layer of the construction material to be solidified, with a common printing device 5 which is movable across the first construction space B1 and the second construction space B2 in a second direction $H_2$, which is arranged at an angle to the first and third directions $H_1$, $H_3$, in order to dispense a flowable treatment agent in a controlled manner to a partial region of a previously applied construction material layer of the first construction space B1 and a partial region of a previously applied construction material layer of the second construction space B2, characterized by a control device C which is configured to control the first coating device 3, the second coating device 13 and the common printing device 5 in such a way that a travel of the first coating device 3 in the first direction $H_1$ across the first construction space B1 and a travel of the second coating device 13 in the third direction $H_3$ across the second construction space B2 overlap in time with at least one of a travel of the printing device 5 in the second direction $H_2$ across the first construction space B1 and a travel of the printing device 5 in the second direction $H_2$ across the second construction space B2, and/or that the supply of construction material to the first construction space B1 by the first coating device 3 and the supply of construction material to the second construction space B2 by the second coating device 13 overlap in time with the controlled dispensing of flowable treatment agent to a previously applied construction material layer of at least one of the first construction space B1 and the second construction space B2.

9. 3D printer according to 8., wherein the printing device 5 comprises a print head 7 which is displaceable in the first direction $H_1$, and the control device C is configured to move the print head several times in the second direction $H_2$ across the first and second construction spaces B1, B2 for selectively printing a construction material layer of the first construction space B1 and a construction material layer of the second construction space B2, for example in such a way that the print head 7 travels in an altogether meandering pattern across the first and the second construction spaces B1, B2, for example along a U-shaped path or an S-shaped path, and/or a distance $S_1$ to be travelled by the first coating device 3 across the first construction space B1 along the first direction $H_1$ is greater than or equal to a (single) distance $S_{21}$ to be travelled by the printing device 5 across the first construction space B1 along the second direction $H_2$, for example at least greater by the factor of 1.2, and/or a distance $S_3$ to be travelled by the second coating device 13 across the second construction space B2 along the third direction $H_3$ is greater than or equal to a (single) distance $S_{22}$ to be travelled by the printing device 5 across the second construction space B2 along the second direction $H_2$, for example at least greater by the factor of 1.2, and/or the first coating device 3 and the second coating device 13 are each configured as a bidirectional coating device and/or wherein the printing device 5 is configured as a bidirectional printing device.

10. 3D printer according to 8. or 9., wherein the first construction space B1 and the second construction space B2 have substantially the same shape and size and/or the first construction space B1 and the second construction space B2, as seen in the second direction $H_2$ are arranged one after the other and/or the first construction space B1 and the second construction space B2 are each formed to be rectangular, for example with two long and two short sides, wherein the first and the second construction spaces B1, B2 are arranged with two long sides adjacent to one another and/or wherein the first direction $H_1$ and the third direction $H_3$ are substantially parallel to the long sides of the first construction space and the long sides of the second construction space, respectively, and/or an output region of the first coating device 3 completely spans the first construction space B1 in a direction perpendicular to the first direction $H_1$ and/or in the second direction $H_2$, and/or an output region of the second coating device 13 completely spans the second construction space B2 in a direction perpendicular to the third direction $H_3$ and/or in the second direction $H_2$, and/or an output region of a print head 7 of the printing device is elongated in a direction perpendicular to the second direction $H_2$ and/or in the first direction $H_1$, and/or an output region of the print head 7 is shorter than the first construction space B1 in a direction perpendicular to the second direction $H_2$ and/or in the first direction $H_1$ and/or shorter than the distance $S_1$ to be travelled by the first coating device 3, for example substantially half the size or smaller, and/or wherein a single distance $S_{21}$ to be travelled by the printing device 5 across the first construction space B1 along the second direction $H_2$ is 1.0 m to 1.4 m, for example 1.2 m, and/or wherein a single distance $S_{22}$ to be travelled by the printing device 5 across the second construction space B2 along the second direction $H_2$ is 1.0 m to 1.4 m, for example 1.2 m, and/or the control device C is configured to move the first coating device 3, the second coating device 13 and the common printing device 5, for example the print head 7, starting from a common first side—as seen in the first and third directions—across the first and second construction spaces to an opposite, second side—as seen in the first and third direction—thereby dispensing particulate material and flowable treatment agent, respectively, and wherein optionally subsequently the first coating device 3, the second coating device 13 and the common printing device 5, for example the print head 7, are moved from the second side back to the first side, thereby again dispensing particulate material and flowable treatment agent, respectively.

11. Generative manufacturing process for producing at least one three-dimensional component, e.g. a casting mold or a foundry core, in a construction space of a 3D printer, comprising: forming layers lying one upon the other of particulate construction material, e.g. containing sand particles, using a coating device 3 which is moved across the construction space B1 in a first direction $H_1$ to apply a respective layer, and selectively printing one or more adjoining construction material layers in a respective partial region thereof using a printing device 5 which is moved across the construction space B1 in a second direction $H_2$, in order to output in a controlled manner a flowable treatment agent to a partial region of a previously applied construction material layer, which treatment agent contributes to a selective solidification thereof, characterized in that the coating device 3 and the printing device 5 are moved in a way to overlap in time across the construction space B1 and/or in that the coating device 3 and the printing device 5, in an overlapping manner, supply construction material to the construction space B1 and dispense flowable treatment agent to a partial region of a previously applied construction material layer, respectively.

12. Generative manufacturing process according to 11., wherein the printing device 5 comprises a print head 7 which is displaceable in the first direction $H_1$, and the print head 7 is moved several times in the second direction $H_2$ across the construction space B1 for selective printing a construction material layer, for example in such a way that the print head 7 travels across the construction space B1 in an altogether meandering pattern, for example along a U-shaped path or an S-shaped path, and/or a distance $S_1$ travelled by the coating device 3 across the construction space B1 along the first direction $H_1$ is greater than or equal to a distance $S_2$ travelled by the printing device 5 when travelling once across the construction space B1 along the second direction $H_2$, and/or a bidirectional coating device is used as coating device 3, and/or particulate construction material is dispensed by means of the coating device 3 during a journey in the first direction and during a return journey in the first direction, and/or a bidirectional printing device is used as printing device 5, and/or flowable treatment agent is dispensed by means of the printing device 5 during a journey in the second direction and during a return journey in the second direction, and/or the coating device 3 and the print head 7 are moved, starting from a common, first side—as seen in the first direction—across the construction space to an opposite, second side—as seen in the first direction—thereby dispensing particulate material and flowable treatment agent, respectively, and wherein optionally subsequently the coating device 3 and the print head 7 are moved from the second side back to the first side, thereby again dispensing particulate material and flowable treatment agent, respectively.

13. Generative manufacturing process according to 11. or 12., wherein an output region of the coating device 3 completely spans the construction space B1 in a direction perpendicular to the first direction $H_1$ and/or in the second direction $H_2$, and/or an output region of a print head 7 of the printing device is elongated in a direction perpendicular to the second direction $H_2$ and/or in the first direction $H_1$, and/or an output region of the print head 7 is, in a direction perpendicular to the second direction $H_2$ and/or in the first direction, shorter than the construction space B1 and/or shorter than the distance $S_1$ to be travelled by the coating device 3, for example substantially half the size or less, and/or the first direction $H_1$ and the second direction $H_2$ intersect each other, thereby forming an angle, for example an angle of substantially 90°, and/or the construction space B1 is formed to be rectangular in a plan view, for example with two long and two short sides, wherein the first direction $H_1$ for example is substantially parallel to the long sides of the construction space B1, and/or the distance $S_1$ to be travelled by the coating device 3 is greater than a single distance $S_2$ to be travelled by the printing device 5 across the construction space B1 along the second direction $H_2$, for example by at least the factor of 1.2, and/or wherein a single distance $S_2$ to be travelled by the printing device 5 across the construction space B1 along the second direction $H_2$ is 1.0 m to 1.4 m, for example 1.2 m.

14. Generative manufacturing process for producing at least one three-dimensional component, e.g. a casting mold or a foundry core, in a first construction space B1 of a 3D printer and at least one three-dimensional component, e.g. a casting mold or a foundry core, in a second construction space B2 of the 3D printer, which is arranged adjacent to the first construction space B1, comprising: forming layers of particulate construction material lying one upon the other, e.g. containing sand particles, in the first construction space B1 using a first coating device 3 which is moved in a first direction $H_1$ across the first construction space B1 to apply a respective layer, forming layers of particulate construction material lying one upon the other, e.g. containing sand particles, in the second construction space B2 using a second coating device 3 which is moved across the second construction space B2 in a third direction $H_3$ substantially parallel to the first direction to apply a respective layer, and selectively printing several adjacent construction material layers in a respective partial region thereof in the first construction space B1 and selectively printing several adjacent construction material layers in a respective partial region thereof in the second construction space B2 using a common printing device 5, which is moved in a second direction $H_2$, which is arranged at an angle to the first and third directions $H_1$, $H_3$, across the first construction space B1 and the second construction space B2, in order to dispense a flowable treatment agent in a controlled manner to a partial region of a previously applied construction material layer in the first construction space B1 and to a partial region of a previously applied construction material layer in the second construction space B2, which treatment agent contributes to a selective solidification of the respective construction material layer, characterized in that a travel of the first coating device 3 in the first direction $H_1$ across the first construction space B1 and a travel of the second coating device 13 in the third direction $H_3$ across the second construction space B2 are carried out in a way to overlap in time with at least one of a travel of the common printing device 5 in the second direction $H_2$ across the first construction space B1 and a travel of the common printing device 5 in the second direction $H_2$ across the second construction space B2, and/or that the supply of construction material to the first construction space B1 by the first coating device 3 and the supply of construction material to the second construction space B2 by the second coating device 13 are carried out in a way to overlap in time with the controlled dispensing of flowable treatment agent to a previously applied construction material layer of at least one of the first construction space B1 and the second construction space B2.

15. Generative manufacturing process according to 14, wherein the common printing device 5 has a common print head 7 which is displaceable in the first direction $H_1$, and the common print head is moved for selectively printing a construction material layer of the first construction space B1 and a construction material layer of the second construction space B2 several times in the second direction $H_2$ across the first and second construction spaces B1, B2, for example in such a way that print head 7 moves altogether in a meandering pattern across the first and second construction spaces B1, B2, for example along a U-shaped path or an S-shaped path, and/or a distance $S_1$ travelled by the first coating device 3 across the first construction space B1 along the first direction $H_1$ is greater than or equal to a (single) distance $S_{21}$ travelled by the printing device 5 across the first construction space B1 along the second direction $H_2$, for example at least greater by the factor of 1.2, and/or a distance $S_3$ travelled by the second coating device 13 across the second construction space B2 along the third direction $H_3$ is greater than or equal to a (single) distance $S_{22}$ across the second construction space B2 along the second direction $H_2$ travelled by the printing device 5, for example at least greater by the factor of 1.2, and/or the first coating device 3 and the second coating device 13 are each operated as a bidirectional coating device and/or wherein the printing device 5 is operated as a bidirectional printing device and/or the first construction space B1 and the second construction space B2 have substantially the same shape and size and/or the first construction space B1 and the second construction space B2 are arranged one after the other as viewed in the second direction $H_2$ and/or the first construction space B1 and the second construction space B2 are each formed to be rectangular, for example with two long and two short sides, wherein the first and second construction spaces B1, B2 are arranged with two long sides adjacent to each other and/or wherein the first direction $H_1$ and the third direction $H_3$ are substantially parallel to the long sides of the first and second construction spaces B1, B2, and/or an output region of the first coating device 3, in a direction perpendicular to the first direction $H_1$ and/or in the second direction $H_2$, completely spans the first construction space B1, and/or an output region of the second coating device 13, in a direction perpendicular to the third direction $H_3$ and/or in the second direction $H_2$, completely spans the second construction space B2, and/or an output region of a print head 7 of the printing device is elongated in a direction perpendicular to the second direction $H_2$ and/or in the first direction $H_1$, and/or an output region of the print head 7, in a direction perpendicular to the second direction $H_2$ and/or in the first direction $H_1$, is shorter than the first construction space B1 and/or shorter than the distance $S_1$ to be travelled by the first coating device 3, for example substantially half the size or less, and/or wherein a single distance $S_{21}$ to be travelled by the printing device 5 across the first construction space B1 along the second direction $H_2$ is 1.0 m to 1.4 m, for example 1.2 m, and/or wherein a single distance $S_{22}$ to be travelled by the printing device 5 across the second construction space B2 along the second direction $H_2$ is 1.0 m to 1.4 m, for example 1.2 m, and/or the first coating device 3, the second coating device 13 and the print head 7 are moved, starting from a common, first side—as seen in the first and third directions—across the first and second construction spaces to an opposite, second side—as seen in the first and third directions—thereby dispensing particulate material and flowable treatment agent, respectively, and wherein optionally subsequently the first coating device 3, the second coating device 13 and the print head 7 are moved from the second side back to the first side, thereby again dispensing particulate material and flowable treatment agent, respectively.

16. 3D printer which is configured to simultaneously build up one or more three-dimensional components, for example a casting mold or a foundry core, in layers in a first construction space B1 and in a second construction space B2 adjacent thereto, wherein a first coating device 3 is assigned to the first construction space B1 and a second coating device 13 is assigned to the second construction space B2, which are movable in a first direction $H_1$ across the first construction space B1 and in a third direction $H_3$ substantially parallel to the first direction, respectively, across the second construction space B2, in order to supply the respective construction space with construction material in the form of a uniform construction material layer of the construction material to be solidified, with a common printing device 5, which is movable in a second direction $H_2$, which is arranged at an angle to the first and third directions $H_1$, $H_3$, across the first construction space B1 and the second construction space B2 to output a flowable treatment agent in a controlled way to a partial region of a previously applied construction material layer of the first construction space B1 and a partial region of a previously applied construction material layer of the second construction space B2, characterized in that a distance $S_1$ to be travelled by the first coating device 3 across the first construction space B1 along the first direction $H_1$ is greater than or equal to a (single) distance $S_{21}$ to be travelled by the printing device 5 across the first construction space B1 along the second direction $H_2$, for example at least greater by the factor of 1.2, and/or a distance $S_3$ to be travelled by the second coating device 13 across the second construction space B2 along the third direction $H_3$ is greater than or equal to a (single) distance $S_{22}$ to be travelled by the printing device 5 across the second construction space B2 along the second direction $H_2$, for example at least greater by the factor of 1.2, and/or the first construction space B1 and the second construction space B2 each have two long and two short sides in a plan view, wherein the first and the second construction spaces B1, B2 are arranged with two long sides adjacent to each other and/or wherein the first direction $H_1$ and the third direction $H_3$ are substantially parallel to the long sides of the first construction space and the long sides of the second construction space, respectively.

The previous description of specific exemplary embodiments has been presented for the purpose of illustration and description. It is not intended to be exhaustive or to limit the invention to the exact forms disclosed, and it is to be understood that various modifications and variations are possible in the light of the teaching disclosed herein. The scope of protection is defined by the attached claims and their equivalents.

The invention claimed is:

1. A 3D printer (10) which is configured to build up one or more three-dimensional components in layers in a first construction space (B1) and in a second construction space (B2) adjacent thereto, the 3D printer (10) comprising:
   a first coating device (3) assigned to the first construction space (B1) and a second coating device (13) assigned to the second construction space (B2), which are movable in a first direction (H1) across the first construction space (B1) and in a third direction (H3) substantially parallel to the first direction across the second construction space (B2), respectively, in order to supply the respective construction space with construction material in a form of a uniform construction material layer of the construction material to be solidified,
   a common printing device (5) which is movable in a second direction (H2) arranged at an angle to the first and third directions (H1, H3), across the first construction space (B1) and the second construction space (B2) in order to output a flowable treatment agent in a controlled manner to a partial region of a previously applied construction material layer of the first construction space (B1) and a partial region of a previously applied construction material layer of the second construction space (B2),
   wherein an output region of the first coating device (3) completely spans the first construction space (B1) in a direction perpendicular to the first direction (H1),
   wherein an output region of the second coating device (13) completely spans the second construction space (B2) in a direction perpendicular to the third direction (H3),
   wherein a distance (S1) to be travelled by the first coating device (3) across the first construction space (B1) along the first direction (H1) is greater than or equal to a single distance (S21) to be travelled by the common printing device (5) across the first construction space (B1) along the second direction (H2), and
   wherein a distance (S3) to be travelled by the second coating device (13) across the second construction space (B2) along the third direction (H3) is greater than or equal to a single distance (S22) to be travelled by the common printing device (5) across the second construction space (B2) along the second direction (H2), and
   further comprising a control device (C) configured to control the first coating device (3), the second coating device (13) and the common printing device (5) in such a way that a travel of the first coating device (3) in the first direction (H1) across the first construction space (B1) and a travel of the second coating device (13) in the third direction (H3) across the second construction space (B2) overlap in time with at least one of a travel of the common printing device (5) in the second direction (H2) across the first construction space (B1) and a travel of the common printing device (5) in the second direction (H2) across the second construction space (B2), and/or that a supply of construction material to the first construction space (B1) by the first coating device (3) and a supply of construction material to the second construction space (B2) by the second coating device (13) overlap in time with the controlled output of flowable treatment agent to a previously applied construction material layer of at least one of the first construction space (B1) and the second construction space (B2), wherein the control device is configured to control the first coating device (3), the second coating device (13), and the common printing device (5) so that a degree of the overlap in time of printing and coating compared to only coating in the first construction space (B1) and the second construction space (B2) is greater than or equal to 20%.

2. The 3D printer (10) according to claim 1, wherein the common printing device (5) comprises a print head (7) displaceable in the first direction (H1), and the control device (C) is configured to move the print head to selectively print a construction material layer of the first construction space (B1) and a construction material layer of the second construction space (B2) several times in the second direction (H2) across the first and second construction spaces (B1, B2) so that the print head (7) moves in an altogether meandering pattern across the first and second construction spaces (B1, B2) in a U-shaped path or an S-shaped path, the distance (S1) to be travelled by the first coating device (3) across the first construction space (B1) along the first direction (H1) is at least by a factor of 1.2 greater than the single distance (S21) to be travelled by the common printing device (5) across the first construction space (B1) along the second direction (H2), the distance (S3) to be travelled by the second coating device (13) across the second construction space (B2) along the third direction (H3) is at least by a factor of 1.2 greater than the single distance (S22) to be travelled by the common printing device (5) across the second construction space (B2) along the second direction (H2), and the first coating device (3) and the second coating device (13) are each configured as B1 directional coating devices and/or wherein the common printing device (5) is configured as a B1 directional printing device.

3. The 3D printer (10) according to claim 1, wherein the first construction space (B1) and the second construction space (B2) have substantially the same shape and size, the first construction space (B1) and the second construction space (B2) are arranged one after the other as viewed in the second direction (H2), the first construction space (B1) and the second construction space (B2) are each formed to be rectangular with two long and two short sides, wherein the first and second construction spaces (B1, B2) are arranged with two long sides adjacent to each other and/or wherein the first direction (H1) and the third direction (H3) are substantially parallel to the long sides of the first construction space and the long sides of the second construction space, respectively, an output region of a print head (7) of the printing device is elongated in a direction perpendicular to the second direction (H2) and/or in the first direction (H1), an output region of the print head (7) in a direction perpendicular to the second direction (H2) and/or in the first direction (H1) is shorter than the first construction space (B1) and/or shorter than the distance (S1) to be travelled by the first coating device (3), the single distance (S21) to be travelled by the common printing device (5) across the first construction space (B1) along the second direction (H2) is 1.0 m to 1.4 m, the single distance (S22) to be travelled by the printing device (5) across the second construction space (B2) along the second direction (H2) is 1.0 m to 1.4 m, and the control device (C) is configured to move the first coating device (3), the second coating device (13) and the common printing device (5) starting from a common first side, across the first and second construction spaces to an opposite second side to dispense particulate material and/or flowable treatment agent, and wherein the control device is further configured to subsequently move the first coating device (3), the second coating device (13) and the common printing device (5) from the second side back to the first side, to dispense once again particulate material and/or flowable treatment agent.

4. The 3D printer (10) according to claim 1, further comprising a third construction space (B3) arranged adjacent to the second construction space (B2), and a third coating device (23) assigned to the third construction space (B3) and movable along a fourth direction (H4) substantially parallel to the first direction (H1) across the third construction space (B3) in order to supply the third construction space (B3) with construction material in the form of a uniform construction material layer of the construction material to be solidified, wherein the 3D printer is configured to build up one or more three-dimensional components in layers in the third construction space (B3), wherein the common printing device (5) is movable in the second direction (H2) across the third construction space (B3) in order to output a flowable treatment agent in a controlled manner onto a partial region of a previously applied construction material layer of the third construction space (B3), wherein an output region of the third coating device (23) completely spans the third construction space (B3) in a direction perpendicular to the fourth direction (H4), wherein a distance to be travelled by the third coating device (23) across the third construction space (B3) along the fourth direction (H4) is greater than or equal to a single distance to be travelled by the common printing device (5) across the third construction space (B3) along the second direction (H2), and wherein the control device (C) is configured to control the first coating device (3), the second coating device (13), the third coating device (23) and the common printing device (5) such that a respective travel of the coating devices across an associated construction space overlaps in time with the travel of the common printing device (5) in the second direction (H2) across at least one of the construction spaces (2, 12, 23), and/or that a supply of construction material to the respective construction space by the associated coating device overlaps in time with the controlled output of flowable treatment agent to a previously applied construction material layer of at least one of the construction spaces (2, 12, 23).

* * * * *